United States Patent
Takazawa

(10) Patent No.: US 8,647,996 B2
(45) Date of Patent: *Feb. 11, 2014

(54) OPTICAL GLASS, PREFORM FOR PRECISION PRESS MOLDING, OPTICAL ELEMENT, METHODS FOR MANUFACTURING THE SAME, AND IMAGE PICKUP DEVICE

(75) Inventor: Hiroki Takazawa, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 13/073,428

(22) Filed: Mar. 28, 2011

(65) Prior Publication Data

US 2011/0245063 A1    Oct. 6, 2011

(30) Foreign Application Priority Data

Mar. 31, 2010  (JP) ................................. 2010-083961

(51) Int. Cl.
*C03C 3/062* (2006.01)
*C03C 3/068* (2006.01)

(52) U.S. Cl.
USPC ................................. 501/73; 501/77; 501/78

(58) Field of Classification Search
USPC ......................... 501/73, 77, 78, 79
See application file for complete search history.

(56) References Cited

U.S. PATENT DOCUMENTS

| | | | |
|---|---|---|---|
| 4,996,173 A | 2/1991 | Tachiwana | |
| 5,858,898 A * | 1/1999 | Nakahara et al. | 501/77 |
| 5,952,256 A * | 9/1999 | Morishita et al. | 501/63 |
| 7,528,083 B2 * | 5/2009 | Shimizu et al. | 501/73 |
| 7,884,040 B2 * | 2/2011 | Tomoe et al. | 501/73 |
| 2003/0191008 A1 | 10/2003 | Uehara | |
| 2004/0220040 A1 | 11/2004 | Uehara | |
| 2005/0026768 A1 | 2/2005 | Shimizu et al. | |
| 2007/0249480 A1 | 10/2007 | Kobayashi et al. | |
| 2009/0082189 A1 | 3/2009 | Shimizu et al. | |
| 2009/0197755 A1 * | 8/2009 | Uehara | 501/63 |
| 2010/0317507 A1 | 12/2010 | Zou et al. | |
| 2011/0034315 A1 * | 2/2011 | Takazawa | 501/79 |

FOREIGN PATENT DOCUMENTS

| | | |
|---|---|---|
| DE | 3906280 A1 | 9/1989 |
| JP | 2002-087841 A | 3/2002 |
| JP | 2004-161598 A | 6/2004 |
| JP | 2009-179522 A | 8/2009 |
| JP | 2009-179528 A | 8/2009 |
| JP | 2009-179538 A | 8/2009 |
| WO | 2004/110942 A1 | 12/2004 |
| WO | WO 2009096437 A1 * | 8/2009 |

OTHER PUBLICATIONS

International Search Report issued on Jul. 13, 2011 for counterpart European patent application No. 11160192.8.
Office Action issued in corresponding Japanese Patent Application No. 2010-083961 dated Sep. 17, 2013.

* cited by examiner

*Primary Examiner* — Karl Group
*Assistant Examiner* — Elizabeth A Bolden
(74) *Attorney, Agent, or Firm* — Sughrue Mion, PLLC

(57) ABSTRACT

The present invention relates to an optical glass, a preform for precision press molding, methods for manufacturing the same, and an image pickup device. The optical glass of the present invention not only has a high refractive index, a high dispersion property, and good precision press moldability, but also has good stability with respect to devitrification when reheated (referred to as "devitrification stability upon reheating"), and is an optical glass with a good partial dispersion ratio (Pg, F).

32 Claims, 1 Drawing Sheet

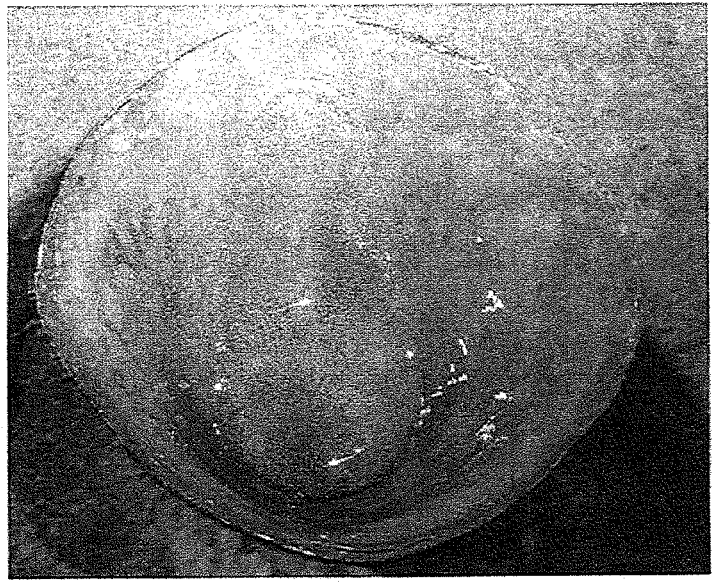

OPTICAL GLASS, PREFORM FOR PRECISION PRESS MOLDING, OPTICAL ELEMENT, METHODS FOR MANUFACTURING THE SAME, AND IMAGE PICKUP DEVICE

TECHNICAL FIELD

The present invention relates to an optical glass, a preform for precision press molding, methods for manufacturing the same, and an image pickup device. The optical glass of the present invention not only has a high refractive index, a high dispersion property, and good precision press moldability, but also has good stability with respect to devitrification when reheated (also referred to as "devitrification stability upon reheating" hereinafter), and is an optical glass with a good partial dispersion ratio (Pg, F).

BACKGROUND ART

There is considerable demand for high-refractive-index, high-dispersion optical glass. In particular, aspherical lenses comprised of such glass are indispensable as high-performance, digital still camera-use lenses.

The precision press molding method (also called the "mold optics pressing method") is a known method of producing large quantities of aspherical lenses. Phosphate-based glasses are known as a high-refractive-index, high-dispersion glasses that can be molded by precision press molding. Phosphate-based optical glasses are good glasses, but present a problem in that the glass surface tends to scratch during precision press molding.

The glasses disclosed in Patent References 1 to 5 are known non-phosphate-based, high-refractive-index, high-dispersion optical glasses. These glasses all have silica-based compositions.

PATENT REFERENCES

Patent Reference 1: WO2004/110942
Patent Reference 2: JP-A-2004-161598
Patent Reference 3: JP-A-2002-87841
Patent Reference 4: JP-A-2009-179522
Patent Reference 5: JP-A-2009-179528

SUMMARY OF THE INVENTION

It is necessary to introduce a component that imparts a high refractive index and high dispersion, such as Nb or Ti, to obtain a high-refractive-index, high-dispersion optical glass, regardless of whether the glass is phosphate-based or silica-based.

When glasses containing Nb, Ti, or the like are precision press molded, an oxidation reduction reaction takes place at the interface of the glass and the precision pressing mold. As a result, there are problems in that bubbles form on the lens surface and it is difficult to maintain a high production yield. These problems appear at high press molding temperatures. However, silica-based glasses have higher glass transition temperatures than phosphate-based glasses, requiring a high press molding temperature and promoting the reaction between the glass and the pressing mold during precision press molding.

For example, the glass disclosed in Patent Reference 1 has a glass transition temperature of 540° C. or higher, presenting a problem in that the glass transition temperature is too high to inhibit the above reaction.

The glass disclosed in Patent Reference 2 presents problems in the same manner as the glass of Patent Reference 1 in the form of low glass stability and a tendency to devitrify. In particular, the glass described in Patent Reference 2 has a refractive index of 1.88 or higher and contains large quantities of components that raise the refractive index of the glass, such as $Ti^{4+}$, $Nb^{5+}$, $W^{6+}$, $Ba^{2+}$, $Ca^{2+}$, $Zr^{4+}$, and $Li^+$.

Patent Reference 3 discloses a medium-refractive-index, high-dispersion glass (claim 1) and a high-refractive-index, high-dispersion glass (claim 2). The high-refractive-index, high-dispersion glass described in Patent Reference 3 contains large quantities of $SiO_2$, which functions to raise the glass transition temperature, and $TiO_2$, which tends to react with the press molding surface during precision press molding. Thus, there is a problem in that when the glass transition temperature is raised, the press molding temperature must also be raised, promoting the reaction between the glass and the pressing mold during precision press molding. There are also problems in that the thermal stability of the glass is low and the liquidus temperature is high.

Patent Reference 4 discloses an optical glass in which the partial dispersion ratio (Pg, F) is kept low while maintaining a high refractive index and a high dispersion property. In the glass of Patent Reference 4, the ratio of $Nb_2O_5$ and $TiO_2$ is adjusted to suppress the partial dispersion ratio (Pg, F). However, the glass described in Patent Reference 4 presents a problem in the form of a high liquidus temperature. The liquidus temperature contributes greatly to glass moldability. When the liquidus temperature is excessively high, glass component striae and compositional variation tend to develop. When molding is attempted at low temperatures to inhibit this, there is a problem in that an excessively low viscosity renders molding difficult.

Patent Reference 5 also discloses an optical glass in which the partial dispersion ratio (Pg, F) is kept low while maintaining a high refractive index and high dispersion property. In the glass of Patent Reference 5, an $Nb_2O_5$ content exceeding 40 weight percent is used to keep the partial dispersion ratio (Pg, F) low. However, the glass described in Patent Reference 5 also presents a problem in the form of a high liquidus temperature. The liquidus temperature contributes greatly to the moldability of the glass. When the liquidus temperature is excessively high, glass component striae and compositional variation tend to develop. When attempting to inhibit this by molding at low temperatures, there is a problem in that an excessively low viscosity renders molding difficult. Since the combined content of $TiO_2$, $Nb_2O_5$, and $ZrO_2$ is large and thermal stability is low, there are problems in that crystals precipitate while stirring the glass melt to obtain a homogenous optical glass, crystals precipitate in the course of casting the glass melt into a casting mold for molding, and the like, greatly hindering the quantity production of optical glass.

Given such conditions, the development of an optical glass of high refractive index and high dispersion that enables production by precision press molding by stabilizing optical elements of high quality, keeps the partial dispersion ratio (Pg, F) low, and suppresses the liquidus temperature is greatly anticipated.

The present invention has for its object to provide a high-refractive-index, high-dispersion glass that solves the above problems, has good devitrification stability upon reheating, exhibits a low partial pressure ratio (Pg, F), and has good precision press moldability; a precision press molding-use preform and an optical element comprised of this optical glass; methods for manufacturing the same; and an image pickup device equipped with this optical element.

The present invention is as set forth below.

[1]
An optical glass in the form of an oxide glass comprising, denoted as cation percentages,
15 to 35 percent of $Si^{4+}$,
0 to 20 percent of $B^{3+}$,
15 to 25 percent of $Nb^{5+}$,
0 to 9 percent of $Ti^{4+}$,
0 to 3 percent of $Zr^{4+}$,
0.25 to 2.5 percent of $W^{6+}$,
0 to 19 percent of $Li^+$,
3 to 19 percent of $Na^+$,
0 to 18 percent of $K^+$,
0 to 9 percent of $Zn^{2+}$,
0 to 2 percent of $Ba^{2+}$, and
0 to 3 percent of $Ca^{2+}$;
wherein the cation ratio of the $Nb^{5+}$ content to the combined content of $Nb^{5+}$ and $Ti^{4+}$ ($Nb^{5+}/(Nb^{5+}+Ti^{4+})$) falls within a range of 0.71 to 1;
H/L falls within a range of 1.15 to 2.55, where H denotes the sum of 20 times the $Si^{4+}$ content and twice the $Nb^{5+}$ content ($20Si^{4+}+2Nb^{5+}$), and L denotes the sum of eight times the $B^{3+}$ content, six times the $Li^+$ content, five times the $Na^+$ content, three times the $K^+$ content, three times the $Zn^+$ content, and seven times the $W^{6+}$ content ($8B^{3+}+6Li^++5Na^++3K^++3Zn^{2+}+7W^{6+}$);
the combined content of $Ti^{4+}$, $Nb^{5+}$, and $Zr^{4+}$ falls within a range of 20 to 30.78 percent;
the combined content of $Ba^{2+}$, $Ca^{2+}$, and $Zr^{4+}$ falls within a range of 0 to 3.79 percent;
the combined content of $Ti^{4+}$, $Nb^{5+}$, $W^{6+}$, $Ba^{2+}$, $Ca^{2+}$, $Zr^{4+}$, and $Li^+$ is 50 percent or less;
the refractive index nd falls within a range of 1.75 to 1.86; and the Abbé number ν(nu)d falls within a range of 24 to 30.

[2]
The optical glass according to [1], wherein the glass transition temperature falls within a range of 480 to 535° C.

[3]
The optical glass according to [1] or [2], wherein the liquidus temperature falls within a range of 1,000 to 1,060° C.

[4]
The optical glass according to any one of [1] to [3], wherein the partial dispersion ratio (Pg, F) is 0.57 to 0.62.

[5]
The optical glass according to any one of [1] to [4], wherein the combined content of $Si^{4+}$ and $B^{3+}$ is 20 to 50 percent.

[6]
The optical glass according to any one of [1] to [5], wherein the $Sr^{2+}$ content falls within a range of 0 to 2 percent.

[7]
The optical glass according to any one of [1] to [6], wherein the combined content of $Ba^{2+}$ and $Ca^{2+}$ falls within a range of 0 to 3 percent.

[8]
The optical glass according to any one of [1] to [7], wherein the combined content of $Li^+$, $Na^+$, and $K^+$ falls within a range of 25 to 45 percent;

[9]
A preform for precision press molding comprised of the optical glass according to any one of [1] to [8].

[10]
A method for manufacturing a preform for precision press molding that produces the preform according to [9] by the steps of heating and melting a glass starting material to prepare a glass melt, and molding the glass melt.

[11]
An optical element comprised of the optical glass according to any one of [1] to [8].

[12]
A method for manufacturing an optical element comprising the steps of heating the preform for precision press molding according to [9], and employing a pressing mold to conduct precision press molding.

[13]
The method for manufacturing an optical element according to [12], wherein the preform for precision press molding and the pressing mold are heated together and precision press molding is conducted.

[14]
The method for manufacturing an optical element according to [12], wherein the preform for precision press molding is heated and then introduced into a preheated pressing mold, and precision press molding is conducted.

[15]
An image pickup device equipped with the optical element according to [11].

The present invention provides a high-refractive-index, high-dispersion optical glass that has good devitrification stability upon reheating, a low partial dispersion ratio (Pg, F), and good precision press moldability. It also provides a preform for precision press molding and an optical element comprised of this optical glass, methods of manufacturing the same, and an image pickup device equipped with this optical element.

BRIEF DESCRIPTION OF DRAWINGS

FIG. 1 shows a photograph of the material constituting Embodiment 40 of Patent Reference 5, devitrified with the glass in a molten state during melting in a comparative example.

MODES FOR CARRYING OUT THE INVENTION

The optical glass of the present invention is described below. The contents and combined contents of the various cation components below are denoted as cation percentages unless specifically noted otherwise.

$Si^{4+}$ and $B^{3+}$ are glass network-forming oxides that are essential components for maintaining glass stability and moldability of the glass melt.

In addition to the above effects, $Si^{4+}$ has the effect of inhibiting phase separation during precision press molding, and functions to improve chemical durability, keep the viscosity down during molding of the glass melt, and maintain a suitable state during molding. However, the addition of an excessive quantity raises the glass transition temperature and liquidus temperature, and decreases meltability and resistance to devitrification. By inhibiting phase separation, it is possible to prevent a drop in the transmittance of the glass due to opacity. From such perspectives, the range of the $Si^{4+}$ content is 15 to 35 percent, preferably falling within a range of 16 to 32 percent, more preferably falling within a range of 17 to 30 percent, and still more preferably, falling within a range of 18 to 29 percent.

In addition to the above effects, $B^{3+}$ functions to enhance meltability and lower the glass transition temperature. However, the addition of an excessive quantity decreases chemical durability. By enhancing meltability, it is possible to obtain a homogenous glass without having to employ a high glass melting temperature. As a result, corrosion of the crucible is inhibited and coloration of the glass due to penetration of materials constituting the crucible, such as platinum, is prevented. From such perspectives, the range of the $B^{3+}$ content is 0 to 20 percent, preferably falling within a range of 1 to 19 percent, more preferably falling within a range of 2 to 18 percent, still more preferably falling within a range of 3 to 17 percent, yet more preferably falling within a range of 4 to 16 percent, and yet still more preferably, falling within a range of 5 to 15 percent.

The refractive index decreases if excessive quantities of $Si^{4+}$ and $B^{3+}$ are incorporated. Thus, the combined content of $Si^{4+}$ and $B^{3+}$ preferably falls within a range of 20 to 50 percent. The combined content of $Si^{4+}$ and $B^{3+}$ more preferably falls within a range of 20 to 45 percent, still more preferably falls within a range of 21 to 44 percent, yet more preferably falls within a range of 22 to 43 percent, and yet still more preferably, falls within a range of 28 to 40 percent.

$Nb^{5+}$, $Ti^{4+}$, $W^{6+}$, and $Zr^{4+}$ are all components that have major effects in achieving a high refractive index and high dispersion.

In addition to the above effects. $Nb^{5+}$ functions to enhance resistance to devitrification and lower the liquidus temperature. It also causes the partial dispersion property to approximate a normal line, that is, causes Δ(DELTA)Pg,F to approach zero. However, the incorporation of an excessive quantity decreases the resistance to devitrification and increases the liquidus temperature. From such perspectives, the range of the $Nb^{5+}$ content is set to 15 to 25 percent. The $Nb^{5+}$ content preferably falls within a range of 16 to 24 percent, more preferably falls within a range of 17 to 23 percent, and still more preferably, falls within a range of 18 to 22 percent.

In addition to the above effects, $Ti^{4+}$ functions to enhance resistance to devitrification and improve chemical durability. However, the addition of an excessive quantity greatly increases the tendency to undergo phase separation during precision press molding. From such perspectives, the range of the $Ti^{4+}$ content is set to 0 to 9 percent. The $Ti^{4+}$ content preferably falls within a range of 1.0 to 9.0 percent, more preferably falls within a range of 1.5 to 9.0 percent, still more preferably falls within a range of 2.0 to 8.5 percent, yet more preferably falls within a range of 2.5 to 8.5 percent, yet still more preferably falls within a range of 2.5 to 8.0 percent, and even more preferably, falls within a range of 2.5 to 7.5 percent.

The cation ratio of the $Nb^{5+}$ content to the combined content of $Nb^{5+}$ and $Ti^{4+}$ ($Nb^{5+}/(Nb^{5+}+Ti^{4+})$) falls within a range of 0.71 to 1. Within this range, an optical glass with a partial dispersion ratio (Pg, F) falling within the desirable range of 0.57 to 0.62 is readily obtained. The cation ratio ($Nb^{5+}/(Nb^{5+}+Ti^{4+})$) preferably falls within a range of 0.72 to 0.95, more preferably falls within a range of 0.73 to 0.9, still more preferably falls within a range of 0.73 to 0.89, and yet still more preferably, falls within a range of 0.73 to 0.88.

In addition to the above effects, $Zr^{4+}$ functions to inhibit phase separation during precision press molding and to enhance chemical durability and resistance to devitrification. However, the incorporation of an excessive quantity decreases resistance to devitrification and increases the liquidus temperature. From such perspectives, the $Zr^{4+}$ content falls within a range of 0 to 3 percent, preferably falls within a range of 0 to 2.5 percent, more preferably falls within a range of 0.1 to 2.0 percent, still more preferably falls within a range of 0.2 to 1.9 percent, and yet still more preferably, falls within a range of 0.3 to 1.8 percent.

In addition to the above effects. $W^{6+}$ functions to improve resistance to devitrification, and inhibits a rise in the liquidus temperature. However, the incorporation of an excessive quantity compromises resistance to devitrification and raises the liquidus temperature. It also tends to intensify coloration. From such perspectives, the $W^{6+}$ content preferably falls within a range of 0.25 to 2.5 percent, more preferably falls within a range of 0.3 to 2.5 percent, still more preferably falls within a range of 0.4 to 2.3 percent, yet more preferably falls within a range of 0.5 to 2.0 percent, and yet still more preferably, falls within a range of 0.5 to 1.65 percent.

$Li^+$, $Na^+$, and $K^+$ are components that have the effects of improving meltability and lowering the glass transition temperature.

$Li^+$ is the alkali metal component that most effectively lowers the glass transition temperature while maintaining a high refractive index. However, the incorporation of an excessive quantity lowers glass stability and raises the liquidus temperature. From such perspectives, the $Li^+$ content is set to within a range of 0 to 19 percent, preferably falling within a range of 5 to 18 percent, more preferably falling within a range of 6 to 19 percent, still more preferably falling within a range of 7 to 18 percent, and yet still more preferably, falling within a range of 10 to 17 percent.

In addition to the above effects, $Na^+$ and $K^+$ function in the presence of $Li^+$ to further increase the stability of the glass through a mixed alkali effect. From this perspective, the content of $Na^+$ is set to a range of 3 to 19 percent, preferably falling within a range of 5 to 18 percent, more preferably falling within a range of 7 to 19 percent, still more preferably falling within a range of 8 to 18 percent, and yet still more preferably, falling within a range of 10 to 17 percent. Similarly, the content of $K^+$ is set to a range of 0 to 18 percent, preferably falling within a range of 1 to 17 percent, still more preferably falling within a range of 1 to 16 percent, yet more preferably falling within a range of 1 to 15 percent, yet still more preferably falling within a range of 1 to 14 percent, even more preferably falling within a range of 1 to 13 percent, and yet even more preferably, falling within a range of 2 to 12 percent.

$Zn^{2+}$, $Ba^{2+}$, $Sr^{2+}$, and $Ca^{2+}$ are components that are useful for adjusting optical constants, that increase meltability and the light transmittance, and that enhance the clarifying effect when added as glass starting materials in the form of carbonates and nitrates.

In addition to the above effects, $Ba^{2+}$ functions to increase the refractive index and inhibit phase separation during precision press molding. However, the addition of an excessive quantity tends to diminish resistance to devitrification, raise the liquidus temperature, and lower chemical resistance. From such perspectives, the content of $Ba^{2+}$ is set to a range of 0 to 2 percent, preferably falling within a range of 0.1 to 2 percent, more preferably falling within a range of 0.2 to 1.9 percent, still more preferably falling within a range of 0.3 to 1.8 percent, yet more preferably falling within a range of 0.4 to 1.7 percent, and yet sill more preferably, falling within the range of 0.5 to 1.6 percent.

In addition to the above effects, $Zn^{2+}$ functions well to lower the glass transition temperature and maintain a high refractive index. However, the incorporation of an excessive quantity tends to lower resistance to devitrification, raise the liquidus temperature, and diminish chemical durability. The $Zn^{2+}$ content preferably falls within a range of 0 to 9 percent, more preferably falls within a range of 0 to 5 percent, still more preferably falls within a range of 0 to 4 percent, yet more preferably falls within a range of 0 to 3 percent, and yet still more preferably, falls within a range of 0 to 2 percent.

In addition to the above effects, $Sr^{2+}$ has the effect of increasing the refractive index, although to a lesser extent than $Ba^{2+}$. It also functions to inhibit phase separation during precision press molding. However, the incorporation of an excessive quantity tends to decrease resistance to devitrification, raise the liquidus temperature, and lower chemical durability. The $Sr^{2+}$ content preferably falls within a range of 0 to 2 percent, more preferably falls within a range of 0 to 1.5 percent, and still more preferably, falls within a range of 0 to 1 percent.

In addition to the above effects, $Ca^{2+}$ functions to inhibit phase separation during precision press molding. However, the incorporation of an excessive quantity tends to decrease resistance to devitrification, increase the liquidus temperature, raise the glass transition temperature, and decrease chemical durability. The $Ca^{2+}$ content preferably falls within a range of 0 to 3 percent, more preferably falls within a range of 0 to 2 percent, still more preferably falls within a range of 0 to 1.5 percent, yet more preferably falls within a range of 0 to 1.0 percent, and yet still more preferably, falls within a range of 0 to 0.9 percent.

H/L falls within a range of 1.15 to 2.55, where H denotes the sum of 20 times the $Si^{4+}$ content and twice the $Nb^{5+}$ content ($20Si^{4+}+2Nb^{5+}$), and L denotes the sum of eight times the $B^{3+}$ content, six times the $Li^+$ content, five times the $Na^+$ content, three times the $K^+$ content, three times the $Zn^+$ content, and seven times the $W^{6+}$ content ($8B^{3+}+6Li^++5Na^++3K^++3Zn^{2+}+7W^{6+}$). $Si^{4+}$ and $Nb^{5+}$ are high Tg components; that is, increasing the content of these components raises the glass transition temperature Tg. Additionally, $B^{3+}$, $Li^+$, $Na^+$, $K^+$, $Zn^{2+}$, and $W^{6+}$ are low Tg components; that is, increasing the content of these components lowers the glass transition temperature Tg. The coefficient of each component indicates the change in the glass transition temperature Tg corresponding to an increase of one cation percent. This point will be described in greater detail below.

Table 1 shows the change in the glass transition temperature Tg for an increase of one cation percent for each component. The index of $\Delta(DELTA)Tg$ for each component was obtained by chemical experimentation.

TABLE 1

Effects of each component to Tg

| Component | Tg |
|---|---|
| Li | −6 |
| Na | −5 |
| K | −3 |
| B | −8 |
| Zn | −3 |
| Nb | +2 |
| W | −7 |
| Si | +20 |

The components given in Table 1 are separated into groups, with those having positive $\Delta(DELTA)Tg$ indexes being in the H group and those having negative $\Delta(DELTA)Tg$ indexes being in the L group. When the coefficients indicated in Table 1 are multiplied by the content of the individual components denoted as cation percentages and denoted as sums, the sum H of the components with positive $\Delta(DELTA)Tg$ indexes is denoted by $20Si^{4+}+2Nb^{5+}$, and the sum of the components with negative $\Delta(DELTA)Tg$ indexes is denoted by $8B^{3+}+6Li^++5Na^++3K^++3Zn^{2+}+7W^{6+}$. The greater the value of H, the higher the Tg exhibited by the glass becomes in relative terms. The greater the value of L, the lower the Tg exhibited by the glass becomes in relative terms. H/L is a relative index of the Tg exhibited by the glass. To obtain a glass in which the Tg is kept low, it suffices to keep H/L low. In the present invention, from the perspective of obtaining an optical glass in which Tg is adjusted to within a range of 480 to 535° C., H/L is set to within a range of 1.15 to 2.55. When H/L is less than 1.15, the sum of components with negative $\Delta(DELTA)$ Tg indexes is excessive, and the Tg of the glass often falls below 480° C. When the glass transition temperature is excessively low, thermal stability decreases. Thus, it is desirable to strike a balance between the glass transition temperature and thermal stability. When H/L exceeds 2.55, the sum of the components with positive $\Delta(DELTA)Tg$ indexes is excessive, and the Tg of the glass often exceeds 535° C. H/L preferably falls within a range of 1.15 to 2.55, more preferably falls within a range of 1.20 to 2.55, still more preferably falls within a range of 1.25 to 2.55, yet more preferably falls within a range of 1.27 to 2.55, and yet still more preferably, falls within a range of 1.30 to 2.55.

Calculation of the H/L of the optical glass described in Patent Reference 1 reveals a range of 2.80 to 3.98, corresponding to a high glass transition temperature of 540° C. and above.

However, the glass Tg is not determined solely by H/L. It also changes based on the ratio of the combined content of components with positive and negative $\Delta(DELTA)Tg$ indexes to the combined content of other components. The present invention also gives desirable ranges for properties other than the Tg. Thus, the components of the glass are determined by taking into account properties in addition to the Tg.

When the combined content of $Ti^{4+}$, $Nb^{5+}$, and $Zr^{4+}$ is less than 20 percent, it becomes difficult to achieve the desired optical characteristics while maintaining the thermal stability of the glass. Additionally, when the combined content of $Ti^{4+}$, $Nb^{5+}$, and $Zr^{4+}$ exceeds 30.78 percent, the thermal stability of the glass decreases greatly and crystals tend to precipitate upon reheating. The liquidus temperature also rises, making it difficult to mold high-quality glass materials. For such reasons, the combined content of $Ti^{4+}$, $Nb^{5+}$, and $Zr^{4+}$ ($Ti^{4+}+Nb^{5+}+Zr^{4+}$) is set to 20 to 30.78 percent. The combined content of $Ti^{4+}$, $Nb^{5+}$, and $Zr^{4+}$ preferably falls within a range of 24 to 29.9 percent.

When the combined content of $Ba^{2+}$, $Ca^{2+}$, and $Zr^{4+}$ exceeds 3.79 percent, the thermal stability of the glass drops abruptly and crystals tend to precipitate upon reheating. Further, the liquidus temperature and glass transition temperature rise, making it difficult to mold high-quality glass materials or compromising press moldability. Accordingly, the combined content of $Ba^{2+}$, $Ca^{2+}$, and $Zr^{4+}$ is set to 0 to 3.79 percent. The combined content of these components preferably falls within a range of 0.5 to 3.75 percent, more preferably within a range of 0.8 to 3.70 percent.

The combined content of $Ba^{2+}$ and $Ca^{2+}$ preferably falls within a range of 0 to 3 percent. When the combined content of $Ba^{2+}$ and $Ca^{2+}$ exceeds 3 percent, the thermal stability of the glass drops abruptly and crystals tend to precipitate upon reheating. Further, the liquidus temperature and glass transition temperature rise, making it difficult to mold high-quality glass materials or compromising press moldability. The combined content of $Ba^{2+}$ and $Ca^{2+}$ more preferably falls within a range of 0.5 to 2.8 percent, and still more preferably, falls within a range of 0.8 to 2.5 percent.

The combined content of $Ti^{4+}$, $Nb^{5+}$, $W^{6+}$, $Ba^{2+}$, $Ca^{2+}$, $Zr^{4+}$, and $Li^+$ is 50 percent or less. As set forth above, $Nb^{5+}$, $Ti^{4+}$, $W^{6+}$, and $Zr^{4+}$ are all components that have major effects in achieving a high refractive index and high dispersion. Both $Ba^{2+}$ and $Ca^{2+}$ are alkaline earth metals that raise the refractive index. Among alkali metal components, $Li^+$ is a component that maintains a high refractive index. The optical glass of the present invention has a relatively high refractive index. The refractive index nd falls within a range of 1.75 to 1.86. A refractive index nd falling within this range can be achieved by keeping the combined content of the above components to 50 percent or less. The combined content of the above components preferably falls within a range of 30 to 50 percent, more preferably falls within a range of 32 to 50 percent, still more preferably falls within a range of 42 to 50 percent, yet more preferably falls within a range of 40 to 49 percent, and yet still more preferably, falls within a range of 42 to 48 percent.

The rare earth components $La^{3+}$, $Gd^{3+}$, $Y^{3+}$, $Yb^{3+}$, and the like function to lower dispersion of the glass and raise the glass transition temperature. Thus, the combined content of rare earth components is preferably kept to within a range of 0 to 1.5 percent. The combined content of rare earth components more preferably falls within a range of 0 to 1 percent, and still more preferably falls within a range of 0 to 0.5 percent. Yet more preferably, no rare earth component is incorporated at all.

$Ge^{4+}$ is an extremely expensive component, and the desired objectives can be achieved without its use. Thus, the content thereof preferably falls within a range of 0 to 1 percent and more preferably falls within a range of 0 to 0.5 percent. Still more preferably, none is incorporated at all.

Pb, Te, Cd, Cr, and As are desirably not incorporated as glass components or additives when their negative environmental effects are taken into account. Cu, Co, Eu, Er, Nd, Pr, Tb, and Fe function to color the glass, so their incorporation into the glass is undesirable.

To achieve the object of the present invention, the combined content of $Si^{4+}$, $B^{3+}$, $Nb^{5+}$, $Ti^{4+}$, $Zr^{4+}$, $W^{6+}$, $Li^+$, $Na^+$, $K^+$, $Ba^{2+}$, $Ca^{2+}$, and $Zn^{2+}$ is preferably 95 percent or higher, more preferably 97 percent or higher, still more preferably 98 percent or higher, yet more preferably 99 percent or higher, and optimally, 100 percent.

Converted to an oxide and based on the total amount of the glass components, 0 to 2 weight percent of $Sb_2O_3$ and 0 to 2 weight percent of $SnO_2$ can be added to the optical glass of the present invention. These additives function as clarifying agents. In addition, $Sb_2O_3$ inhibits coloration of the glass due to contamination by impurities such as Fe. $Sb_2O_3$ and $SnO_2$ are desirably added in quantities of 0 to 1 weight percent respectively, preferably 0 to 0.5 weight percent, based on the total amount of the glass components.

As an oxide glass, the optical glass of the present invention comprises 50 anion percent or more of $O^{2-}$ among the anion components. Small quantities of $F^-$, $Cl^-$, $I^-$, and $Br^-$ can also be incorporated. The $O^{2-}$ content preferably falls within a range of 50 to 100 anion percent, more preferably falls within a range of 80 to 100 anion percent, still more preferably 85 to 100 anion percent, yet more preferably 90 to 100 anion percent, yet still more preferably 95 to 100 anion percent, even more preferably 98 to 100 anion percent, even still more preferably 99 to 100 anion percent, and optimally, 100 anion percent.

[The Refractive Index and Abbé Number]

The refractive index nd of the optical glass of the present invention falls within a range of 1.75 to 1.86, and the Abbé number v(nu)d falls within a range of 24 to 30. Keeping the refractive index nd within this range makes it possible to obtain an optical glass that is suitable as the material of optical elements constituting high functional, compact optical systems. Using a high-refractive-index glass makes it possible to lessen the curvature of the lens surface when producing lenses of identical converging power. As a result, the moldability of the lens during precision press molding is improved. An Abbé number v(nu)d falling within the above range makes it possible to obtain an optical glass that is suitable as the material of a lens that is capable of good correction of chromatic aberration when combined with a lens comprised of low-dispersion glass.

The refractive index nd preferably falls within a range of 1.755 to 1.855, more preferably falls within a range of 1.756 to 1.854, and still more preferably, falls within a range of 1.79 to 1.85. The Abbé number v(nu)d preferably falls within a range of 24.0 to 29.5, more preferably falls within a range of 24.2 to 28, and still more preferably, falls within a range of 24.5 to 27.5. An excessively high refractive index or an excessively low Abbé number v(nu)d tends to lower the stability of the glass and raise the glass transition temperature.

[The Glass Transition Temperature]

The glass transition temperature of the optical glass of the present invention preferably falls within a range of 480 to 535° C., more preferably falls within a range of 485 to 530° C., and still more preferably, falls within a range of 490 to 530° C. As the glass transition temperature decreases, the press molding temperature can be set lower. The degree to which the reaction at the interface of the glass and the pressing mold progresses during precision press molding is greatly affected by the press molding temperature. Accordingly, a reduction of only several degrees Celsius, or several tens of degrees Celsius, can greatly suppress the interface reaction. Generally, raising the refractive index tends to raise the glass transition temperature. However, the present invention makes it possible to obtain a high-refractive-index glass with a glass transition temperature that is low enough for precision press molding.

[The Liquidus Temperature]

The liquidus temperature of the optical glass of the present invention preferably falls within a range of 1,000 to 1,060° C. The liquidus temperature more preferably falls within a range of 1,000 to 1,055° C., and still more preferably, falls within a range of 1,000 to 1,050° C. Maintaining a low liquidus temperature makes it possible to lower the temperature when molding the glass melt. Keeping the molding temperature low inhibits the volatilization of volatile components such as boric acid and alkali metals from the surface of the glass melt, and prevents variation in glass characteristics and the generation of surface striae.

Generally, raising the refractive index tends to raise the liquidus temperature. However, the present invention makes it possible to obtain a glass with a low liquidus temperature that lends itself well to quantity production while retaining a high refractive index. It is generally difficult to simultaneously achieve a high refractive index, a low glass transition temperature, and a low liquidus temperature. However, the present invention makes to possible to simultaneously achieve all three.

[Partial Dispersion]

In image pickup optical systems, projection optical systems, and the like, the combined use of a lens made of low-dispersion glass and a lens made of high-dispersion glass is effective to achieve high-order achromatism. However, the glass with the lower dispersion will often exhibit a large partial dispersion ratio. It is thus more effective to combine a lens made of a glass with a low partial dispersion ratio in addition to a high-dispersion property when correcting higher order chromatic aberration.

The present invention provides a high-refractive-index, low-dispersion optical glass with a low partial dispersion ratio that is suited to the correction of high-order chromatic aberration.

The partial dispersion ratio Pg,F is denoted as (ng−nF)/(nF−nc) using the individual refractive indexes ng, nF, and nc of g radiation, F radiation, and c radiation. In a graph of the partial dispersion ratio Pg,F–Abbé number v(nu)d, when the partial dispersion ratio on the normal line serving as the reference for a normal partial dispersion glass is denoted as $Pg,F^{(0)}$, $Pg,F^{(0)}$ can be denoted by the following equation using the Abbé number v(nu)d:

$$Pg,F^{(0)}=0.6483-(0.0018\times v(nu)d)$$

Δ(DELTA)Pg,F is the deviation of the partial dispersion ratio Pg,F from this normal line, and can be denoted by the following equation:

$$\Delta(\text{DELTA})Pg, F = Pg, F - Pg, F^{(0)}$$
$$= Pg, F + (0.0018 \times v(nu)d) - 0.6483$$

The partial dispersion ratio Pg,F of the optical glass of the present invention is preferably 0.57 to 0.62, more preferably 0.58 to 0.62, and still more preferably, 0.59 to 0.62. In the optical glass of the present invention, the deviation Δ(DELTA)Pg,F in partial dispersion ratio Pg,F is preferably 0.016 or less, more preferably 0.015 or less, and still more preferably, 0.014 or less. This yields a glass that is well suited to the correction of high-order chromatic aberration.

The optical glass of the present invention, while being a high-refractive-index, high-dispersion glass, exhibits high light transmittance over a broad range of the visible region. It is thus suitable as a glass material for the fabrication of optical elements that are required to have high transmittance in the visible region, such as prisms. The range of the degree of coloration lambda 80 preferably lies at or below 515 nm, and more preferably lies at or below 505 nm. This indicates a spectral transmittance over the lambda 80 to 700 wavelength region of 80 percent or higher. The range of the degree of coloration lambda 70 preferably lies at or below 440 nm, and more preferably lies at or below 430 nm. The range of the degree of coloration lambda 5 desirably lies at or below 365 nm, and more preferably lies at or below 363 nm. This indicates a spectral transmittance over the lambda 70 to 700 nm wavelength region of 70 percent or higher.

[Manufacturing the Optical Glass]

The optical glass of the present invention can be obtained by weighing out, proportioning, and thoroughly mixing starting materials in the form of oxides, carbonates, sulfates, nitrates, hydroxides, and the like so as to obtain a mixed batch with a targeted glass composition; heating, melting, debubbling, and stirring the mixed batch in a melting vessel to prepare a homogenous glass melt containing no bubbles; and molding the glass melt. Specifically, it can be prepared using known melting methods.

[The Preform for Precision Press Molding]

The preform for precision press molding of the present invention will be described next.

The preform for precision press molding of the present invention is characterized by being comprised of the optical glass of the present invention set forth above. The preform for precision press molding (referred to as the "preform" hereinafter) means a piece of glass that is used in precision press molding in the form of a glass gob with a weight corresponding to that of a precision press molded article.

The preform will be described in detail below. The term "preform" means a premolded glass member that is heated and employed in precision press molding. The term "precision press molding," often and widely referred to as "mold optics molding," is a method of forming the optically functional surface of an optical element by transferring the molding surface of a pressing mold. The term "optically functional surface" means a surface that refracts, reflects, diffracts, admits, or emits light that is to be controlled in an optical element. The lens surface of a lens and the like correspond to optically functional surfaces.

The outer surface of the preform is desirably coated with a mold-releasing film so that the glass extends well along the molding surface while preventing a reaction between, and fusion of, the glass and the molding surface of the pressing mold during precision press molding. Examples of the mold-releasing film are noble metals (platinum, platinum alloy), oxides (oxides of Si, Al, Zr, La, Y or the like), nitrides (nitrides of B, Si, Al, and the like), and carbon-containing films.

Carbon-containing films that have carbon as their chief component (when the contents of the elements in the film are denoted as atomic percentages, the content of carbon is greater than the contents of the other elements) are desirable. Specific examples are carbon films and hydrogen carbide films. Known methods such as vacuum vapor deposition, sputtering, and ion plating employing a carbon starting material, and known methods such as thermal decomposition employing a material gas in the form of a hydrocarbon or the like can be employed as the method of forming the carbon-containing film. Other films can be formed by vapor deposition, sputtering, ion plating, the sol-gel process, or the like.

The preform is fabricated by the steps of heating and melting glass starting materials to prepare a glass melt, and molding the glass melt.

The first preform preparation example is a method of separating a glass melt gob of prescribed weight from a glass melt, cooling the glass melt gob, and molding it into a preform of identical weight. For example, glass starting materials are melted, clarified, and homogenized to prepare a homogenous glass melt. The glass melt is caused to flow through an outflow nozzle or an outflow pipe of regulated temperature made of platinum or a platinum alloy. When molding small preforms or spherical preforms, the glass melt is caused to drip down from the outflow nozzle in the form of glass melt droplets of prescribed weight. These droplets are received by preform-forming molds and molded into preforms. Alternately, glass melt droplets of prescribed weight are similarly caused to drip from an outflow nozzle into liquid nitrogen or the like to mold preforms. When fabricating medium or large preforms, a glass melt flow is caused to flow out of an outflow pipe, the tip of the glass melt flow is received on a preform-forming mold, a constriction is formed between the glass melt flow nozzle and the preform-forming mold, and the preform-forming mold is abruptly lowered downward. This separates the glass melt flow at the constriction by means of the surface tension of the glass melt. A glass melt gob of prescribed weight is then received in a receiving member and molded into a preform.

To manufacture a preform having a smooth surface free of scratches, grime, creases, and surface alterations, such as a preform having a free surface, it is possible to employ a method such as molding a preform while subjecting a glass melt gob to wind pressure on a preform-forming mold to float the gob, or molding a glass melt droplet into a preform by introducing it into a medium, such as liquid nitrogen, that is a gas at ordinary temperature and ordinary pressure but has been liquefied by refrigeration.

When molding a preform while floating a glass melt gob, a gas (called a "float gas") is blown onto the glass melt gob to generate upward wind pressure. In this process, if the viscosity of the glass melt gob is excessively low, the float gas penetrates the glass, remaining within the preform in the form of bubbles. By adjusting the viscosity of the glass melt gob to 3 to 60 dPa·s, it is possible to float the glass gob without causing the float gas to penetrate the glass.

Examples of gases that can be employed as float gases to blow the preform are air. $N_2$ gas, $O_2$ gas, Ar gas, He gas, and steam. The wind pressure is not specifically limited other than that it be capable of floating the preform in such a manner that it not come in contact with solid bodies such as the surface of the forming mold.

Many precision press molded articles (such as optical elements) that are manufactured from preforms have rotational axes of symmetry like those of lenses. It is thus desirable for the preform to have a shape with a rotational axis of symmetry. Specific examples are spheres and shapes having one rotational axis of symmetry. Shapes having one rotational axis of symmetry are shapes with smooth contour lines free of angles and indentations in a cross-section comprising a rotational axis of symmetry. One example is a shape with a contour line in the form of an ellipse in which the minor axis corresponds to the rotational axis of symmetry in the above cross-section. Further examples are a shape in the form of an oblate sphere (a shape in which the dimensions are reduced in the direction of one of the axes passing through the center of the sphere); a shape in which a surface containing one of the two points of intersection of a rotational axis of symmetry with the surface is concave, and a surface containing the other point of intersection is convex; and a shape in which the surfaces containing the two points of intersection are both concave.

In a second preform preparation example, a homogenous glass melt is cast into a casting mold and molded, strain of the molded member is eliminated by annealing, and the molded member is divided into prescribed dimensions and shape by cutting or slicing, yielding multiple pieces of glass. The pieces of glass are polished to smooth the surfaces thereof and produce preforms comprised of a prescribed weight of glass. The surfaces of the preforms prepared in this manner are also desirably coated with a carbon-containing film for use.

[The Optical Element]

The optical element of the present invention will be described next. The optical element of the present invention is characterized by comprising the optical glass of the present invention set forth above. Specific examples are: lenses such as aspherical lenses, spherical lenses, plano-concave lenses, plano-convex lenses, biconcave lenses, biconvex lenses, convex meniscus lenses, and concave meniscus lenses; microlenses; lens arrays; lenses with diffraction gratings; prisms; and prisms with lens functions. As needed, an antireflective film, a partially reflective film with wavelength selectivity, or the like can be provided on the surface.

The optical element of the present invention is comprised of glass with a high dispersion property and a low partial dispersion ratio. It can thus be combined with an optical element comprised of another glass to correct high-order chromatic aberration. Since the optical element of the present invention is comprised of glass with a high refractive index, it can be used in image pickup optical systems, projection optical systems, and the like to render such optical systems compact.

[The Method for Manufacturing an Optical Element]

The method for manufacturing an optical element of the present invention will be described next.

The method for manufacturing an optical element of the present invention is characterized by comprising the steps of heating the preform for precision press molding of the present invention set forth above and employing a pressing mold to conduct precision press molding.

To prevent oxidation of the molding surface of the pressing mold and mold-releasing film provided on the molding surface of the pressing mold, the steps of heating the pressing mold and preform and conducting pressing are desirably conducted in a non-oxidizing atmosphere such as nitrogen or a mixture of nitrogen gas and hydrogen gas. In a non-oxidizing gas atmosphere, the film remains on the surface of the precision press molded article without oxidizing the carbon-containing film covering the preform surface. This film must ultimately be removed. To relatively easily and completely remove the carbon-containing film, it suffices to heat the precision press molded article in an oxidizing atmosphere such as air. The oxidation and removal of the carbon-containing film must be conducted at a temperature at which the precision press molded article is not deformed by heat. Specifically, these are desirably conducted within a temperature range lying below the glass transition temperature.

A pressing mold the molding surface of which has been preprocessed with great precision to a desired shape is employed in precision press molding. It suffices to form a mold-releasing film on the molding surface to prevent fusion with the glass during pressing. Examples of mold-releasing films are carbon-containing films, nitride films, and noble metal films. Hydrogenated carbon films, carbon films, and the like are desirable as carbon-containing films. In precision press molding, a preform is fed between an opposing pair of molds comprised of an upper mold and a lower mold the molding surfaces of which have been processed to precise shapes, both the forming molds and preform are heated to a temperature corresponding to a glass viscosity of $10^5$ to $10^9$ dPa·s to soften the preform, and the preform is pressure molded to precisely transfer the molding surfaces of the forming molds to the glass.

It is also possible to feed a preform that has been preheated to a temperature corresponding to a glass viscosity of $10^4$ to $10^8$ m dPa·s between an opposing pair of molds comprised of an upper mold and a lower mold the molding surfaces of which have been processed to precise shapes, and pressure mold the preform to precisely transfer the molding surfaces of the forming molds to the glass.

The pressure and duration of pressing can be suitably determined taking into account the viscosity of the glass and the like. For example, a pressing pressure of about 5 to 15 MPa and a pressing duration of 10 to 300 seconds can be employed.

Pressing conditions such as the pressing duration and pressing pressure can be suitably set within known ranges in accordance with the shape and dimensions of the article being molded.

Subsequently, the pressing mold and the precision press molded article are cooled, the mold is opened at a temperature that is desirably lower than the strain point, and the precision press molded article is removed from the mold. It suffices to suitably adjust the annealing conditions, such as the annealing rate, of the molded article during cooling to bring optical characteristics precisely in line with targeted values.

The above methods for manufacturing an optical element can be roughly divided into the following two methods. The first method is a method for manufacturing an optical element in which the preform is introduced into a pressing mold and the pressing mold and glass material are heated together. The second method is a method for manufacturing an optical element in which the preform is heated and then introduced into a preheated pressing mold, where it is precision press molded. This method is recommended when the focus is on enhancing productivity.

The optical element of the present invention can be fabricated without a press molding step. For example, a homogenous glass melt is cast into a casting mold to mold a glass block. The glass block is annealed to remove strain while subjecting it to optical characteristic adjustment by adjusting the annealing conditions to achieve a glass refractive index of desired value. Next, the glass block is cut or sliced into pieces of glass which are then ground and polished to obtain finished optical elements.

EMBODIMENTS

The present invention will be specifically described below through embodiments. However, the present invention is not limited to the embodiments.

Embodiment 1

Oxides, carbonates, sulfates, nitrates, hydroxides, and the like were employed as starting materials for introducing various components. These were weighed out to yield the glass compositions given in Table 2 and thoroughly mixed to obtain blended starting materials. The blended starting materials were charged to platinum crucibles, heated, and melted. Following melting, the glass melts were caused to flow into casting molds, cooled to close to the glass transition temperature, and then immediately placed in annealing furnaces. Annealing was conducted for about an hour within the glass transition temperature range, after which the glasses were cooled within the furnaces to room temperature, yielding optical glasses Nos. 1 to 78.

TABLE 2

| No. | | $Si^{4+}$ | $B^{3+}$ | $Al^{3+}$ | $Li^+$ | $Na^+$ | $K^+$ | $Mg^{2+}$ | $Ca^{2+}$ | $Sr^{2+}$ | $Ba^{2+}$ | $Zn^{2+}$ |
|---|---|---|---|---|---|---|---|---|---|---|---|---|
| 1 | Cation % | 20.15 | 14.89 | 0.00 | 14.89 | 14.89 | 2.28 | 0.00 | 0.38 | 0.00 | 1.31 | 1.49 |
| 2 | Cation % | 20.15 | 16.38 | 0.00 | 14.89 | 14.89 | 2.28 | 0.00 | 0.38 | 0.00 | 1.31 | 0.00 |
| 3 | Cation % | 20.75 | 14.89 | 0.00 | 14.89 | 14.89 | 2.28 | 0.00 | 0.38 | 0.00 | 1.31 | 1.49 |
| 4 | Cation % | 20.75 | 14.89 | 0.00 | 14.89 | 14.89 | 2.28 | 0.00 | 0.38 | 0.00 | 1.31 | 1.49 |
| 5 | Cation % | 20.75 | 14.89 | 0.00 | 14.89 | 14.89 | 2.28 | 0.00 | 0.38 | 0.00 | 1.31 | 1.49 |
| 6 | Cation % | 21.15 | 14.89 | 0.00 | 14.89 | 14.89 | 2.28 | 0.00 | 0.38 | 0.00 | 1.31 | 1.49 |
| 7 | Cation % | 21.34 | 14.89 | 0.00 | 14.89 | 14.89 | 2.28 | 0.00 | 0.38 | 0.00 | 1.31 | 1.49 |
| 8 | Cation % | 25.12 | 9.93 | 0.00 | 14.89 | 14.89 | 2.28 | 0.00 | 0.38 | 0.00 | 1.31 | 1.49 |
| 9 | Cation % | 22.25 | 10.45 | 0.00 | 15.67 | 15.67 | 2.40 | 0.00 | 0.40 | 0.00 | 1.38 | 1.57 |
| 10 | Cation % | 22.14 | 12.91 | 0.00 | 14.89 | 14.89 | 2.28 | 0.00 | 0.38 | 0.00 | 1.31 | 1.49 |
| 11 | Cation % | 28.09 | 6.95 | 0.00 | 14.89 | 14.89 | 2.28 | 0.00 | 0.38 | 0.00 | 1.31 | 1.49 |
| 12 | Cation % | 21.79 | 12.28 | 0.00 | 15.35 | 15.35 | 2.35 | 0.00 | 0.39 | 0.00 | 1.35 | 1.53 |
| 13 | Cation % | 24.62 | 10.42 | 0.00 | 14.89 | 14.89 | 2.28 | 0.00 | 0.38 | 0.00 | 1.31 | 1.49 |
| 14 | Cation % | 24.12 | 10.92 | 0.00 | 14.89 | 14.89 | 2.28 | 0.00 | 0.38 | 0.00 | 1.31 | 1.49 |
| 15 | Cation % | 20.25 | 15.39 | 0.00 | 14.89 | 14.89 | 2.28 | 0.00 | 0.38 | 0.00 | 1.31 | 0.99 |
| 16 | Cation % | 20.25 | 15.39 | 0.00 | 6.95 | 14.89 | 10.23 | 0.00 | 0.38 | 0.00 | 1.31 | 0.99 |
| 17 | Cation % | 20.25 | 15.39 | 0.00 | 0.00 | 14.89 | 17.17 | 0.00 | 0.38 | 0.00 | 1.31 | 0.99 |
| 18 | Cation % | 19.29 | 14.66 | 0.00 | 14.19 | 14.19 | 6.90 | 0.00 | 0.36 | 0.00 | 1.25 | 0.95 |
| 19 | Cation % | 18.42 | 14.00 | 0.00 | 13.55 | 13.55 | 11.11 | 0.00 | 0.34 | 0.00 | 1.19 | 0.90 |
| 20 | Cation % | 18.85 | 14.32 | 0.00 | 13.86 | 13.86 | 9.05 | 0.00 | 0.35 | 0.00 | 1.22 | 0.92 |
| 21 | Cation % | 19.11 | 14.52 | 0.00 | 14.05 | 14.05 | 7.78 | 0.00 | 0.36 | 0.00 | 1.24 | 0.94 |
| 22 | Cation % | 18.76 | 14.26 | 0.00 | 13.80 | 13.80 | 9.47 | 0.00 | 0.35 | 0.00 | 1.21 | 0.92 |
| 23 | Cation % | 19.20 | 14.59 | 0.00 | 14.12 | 14.12 | 7.81 | 0.00 | 0.36 | 0.00 | 0.77 | 0.94 |
| 24 | Cation % | 19.25 | 14.63 | 0.00 | 14.15 | 14.15 | 7.83 | 0.00 | 0.36 | 0.00 | 0.54 | 0.94 |
| 25 | Cation % | 19.11 | 14.52 | 0.00 | 14.05 | 14.05 | 7.78 | 0.00 | 0.00 | 0.00 | 1.59 | 0.94 |
| 26 | Cation % | 19.96 | 15.16 | 0.00 | 13.14 | 13.14 | 7.27 | 0.00 | 0.37 | 0.00 | 0.80 | 0.98 |
| 27 | Cation % | 20.35 | 15.46 | 0.00 | 12.62 | 12.62 | 6.98 | 0.00 | 0.38 | 0.00 | 0.82 | 1.00 |
| 28 | Cation % | 20.35 | 15.46 | 0.00 | 11.84 | 11.84 | 8.55 | 0.00 | 0.38 | 0.00 | 0.82 | 1.00 |
| 29 | Cation % | 20.98 | 10.80 | 0.00 | 13.01 | 13.01 | 9.26 | 0.00 | 0.39 | 0.00 | 0.84 | 1.03 |
| 30 | Cation % | 20.56 | 10.58 | 0.00 | 12.75 | 12.75 | 11.09 | 0.00 | 0.38 | 0.00 | 0.83 | 1.01 |
| 31 | Cation % | 20.98 | 9.77 | 0.00 | 13.01 | 13.01 | 10.28 | 0.00 | 0.39 | 0.00 | 0.84 | 1.03 |
| 32 | Cation % | 21.20 | 10.91 | 0.00 | 13.15 | 13.15 | 8.31 | 0.00 | 0.39 | 0.00 | 0.85 | 1.04 |
| 33 | Cation % | 21.42 | 11.03 | 0.00 | 13.28 | 13.28 | 9.45 | 0.00 | 0.40 | 0.00 | 0.86 | 1.05 |
| 34 | Cation % | 21.42 | 8.93 | 0.00 | 13.28 | 13.28 | 10.50 | 0.00 | 0.40 | 0.00 | 0.86 | 1.05 |
| 35 | Cation % | 21.88 | 8.04 | 0.00 | 13.57 | 13.57 | 10.73 | 0.00 | 0.41 | 0.00 | 0.88 | 1.07 |
| 36 | Cation % | 22.24 | 7.09 | 0.00 | 13.79 | 13.79 | 10.90 | 0.00 | 0.41 | 0.00 | 0.89 | 1.09 |
| 37 | Cation % | 22.36 | 7.12 | 0.00 | 13.87 | 13.87 | 10.96 | 0.00 | 0.42 | 0.00 | 0.90 | 1.10 |
| 38 | Cation % | 22.33 | 7.12 | 0.00 | 13.85 | 13.85 | 10.95 | 0.00 | 0.00 | 0.00 | 0.90 | 1.09 |
| 39 | Cation % | 22.44 | 7.15 | 0.00 | 13.91 | 13.91 | 11.00 | 0.00 | 0.42 | 0.00 | 0.00 | 1.10 |
| 40 | Cation % | 22.48 | 7.16 | 0.00 | 13.94 | 13.94 | 11.02 | 0.00 | 0.42 | 0.00 | 0.90 | 0.00 |
| 41 | Cation % | 22.30 | 7.11 | 0.00 | 13.83 | 13.83 | 10.93 | 0.00 | 0.42 | 0.00 | 0.90 | 1.09 |
| 42 | Cation % | 22.88 | 7.29 | 0.00 | 14.19 | 14.19 | 11.22 | 0.00 | 0.00 | 0.00 | 0.92 | 0.00 |
| 43 | Cation % | 20.99 | 7.42 | 0.00 | 14.43 | 14.43 | 11.41 | 0.00 | 0.00 | 0.00 | 1.51 | 0.00 |
| 44 | Cation % | 22.99 | 7.33 | 0.00 | 14.26 | 14.26 | 9.02 | 0.00 | 0.43 | 0.00 | 0.92 | 0.00 |
| 45 | Cation % | 22.73 | 7.24 | 0.00 | 14.10 | 14.10 | 8.92 | 0.00 | 0.42 | 0.00 | 0.91 | 0.00 |
| 46 | Cation % | 22.36 | 7.12 | 0.00 | 13.87 | 13.87 | 10.96 | 0.00 | 0.96 | 0.00 | 0.90 | 0.00 |
| 47 | Cation % | 22.24 | 7.09 | 0.00 | 13.79 | 13.79 | 10.90 | 0.00 | 0.41 | 0.00 | 0.89 | 0.00 |
| 48 | Cation % | 22.99 | 7.33 | 0.00 | 13.45 | 13.45 | 10.63 | 0.00 | 0.43 | 0.00 | 0.92 | 0.00 |
| 49 | Cation % | 23.52 | 7.49 | 0.00 | 14.59 | 14.59 | 6.92 | 0.00 | 0.44 | 0.00 | 0.95 | 0.00 |
| 50 | Cation % | 25.43 | 5.61 | 0.00 | 15.77 | 15.77 | 4.99 | 0.00 | 0.47 | 0.00 | 1.02 | 0.00 |
| 51 | Cation % | 21.28 | 10.95 | 0.00 | 13.20 | 13.20 | 9.39 | 0.00 | 0.00 | 0.00 | 0.86 | 0.00 |
| 52 | Cation % | 21.74 | 10.12 | 0.00 | 13.48 | 13.48 | 8.52 | 0.00 | 0.00 | 0.00 | 0.87 | 0.00 |
| 53 | Cation % | 21.97 | 9.15 | 0.00 | 13.62 | 13.62 | 8.62 | 0.00 | 0.00 | 0.00 | 0.88 | 0.00 |
| 54 | Cation % | 21.66 | 11.15 | 0.00 | 13.43 | 13.43 | 9.55 | 0.00 | 0.00 | 0.00 | 0.87 | 0.00 |
| 55 | Cation % | 21.94 | 10.22 | 0.00 | 13.60 | 13.60 | 8.60 | 0.00 | 0.00 | 0.00 | 0.88 | 0.00 |
| 56 | Cation % | 22.13 | 10.30 | 0.00 | 13.72 | 13.72 | 8.68 | 0.00 | 0.00 | 0.00 | 0.89 | 0.00 |
| 57 | Cation % | 22.54 | 9.39 | 0.00 | 13.98 | 13.98 | 9.94 | 0.00 | 0.00 | 0.00 | 0.91 | 0.00 |
| 58 | Cation % | 22.81 | 8.38 | 0.00 | 14.14 | 14.14 | 10.06 | 0.00 | 0.00 | 0.00 | 0.92 | 0.00 |
| 59 | Cation % | 22.81 | 7.83 | 0.56 | 14.14 | 14.14 | 10.06 | 0.00 | 0.00 | 0.00 | 0.92 | 0.00 |
| 60 | Cation % | 22.77 | 7.25 | 0.00 | 14.12 | 14.12 | 11.16 | 0.00 | 0.00 | 0.00 | 0.92 | 0.00 |
| 61 | Cation % | 22.72 | 8.35 | 0.00 | 14.09 | 14.09 | 8.91 | 0.00 | 0.00 | 0.00 | 0.91 | 0.00 |
| 62 | Cation % | 22.64 | 7.21 | 0.00 | 14.04 | 14.04 | 11.10 | 0.00 | 0.00 | 0.00 | 0.91 | 0.00 |
| 63 | Cation % | 23.67 | 5.22 | 0.00 | 14.68 | 14.68 | 9.28 | 0.00 | 0.00 | 0.00 | 0.95 | 0.00 |
| 64 | Cation % | 20.63 | 10.65 | 0.00 | 14.18 | 14.18 | 8.97 | 0.00 | 0.00 | 0.00 | 0.92 | 0.00 |

TABLE 2-continued

| No. | | | | | | | | | | | | |
|---|---|---|---|---|---|---|---|---|---|---|---|---|
| 65 | Cation % | 22.96 | 10.19 | 0.00 | 13.57 | 13.57 | 8.58 | 0.00 | 0.00 | 0.00 | 0.88 | 0.00 |
| 66 | Cation % | 22.49 | 10.47 | 0.00 | 13.95 | 13.95 | 8.82 | 0.00 | 0.00 | 0.00 | 0.90 | 0.00 |
| 67 | Cation % | 22.42 | 10.44 | 0.00 | 13.90 | 13.90 | 8.79 | 0.00 | 0.00 | 0.00 | 0.90 | 0.00 |
| 68 | Cation % | 23.13 | 10.77 | 0.00 | 14.34 | 14.34 | 6.80 | 0.00 | 0.00 | 0.00 | 0.93 | 0.00 |
| 69 | Cation % | 24.26 | 11.30 | 0.00 | 15.04 | 15.04 | 5.95 | 0.00 | 0.00 | 0.00 | 0.98 | 0.00 |
| 70 | Cation % | 25.06 | 11.67 | 0.00 | 15.54 | 15.54 | 4.91 | 0.00 | 0.00 | 0.00 | 1.01 | 0.00 |
| 71 | Cation % | 26.36 | 12.27 | 0.00 | 16.34 | 16.34 | 2.58 | 0.00 | 0.00 | 0.00 | 1.06 | 0.00 |
| 72 | Cation % | 28.23 | 13.15 | 0.00 | 17.50 | 17.50 | 0.00 | 0.00 | 0.00 | 0.00 | 1.13 | 0.00 |
| 73 | Cation % | 25.25 | 13.67 | 0.00 | 15.82 | 15.82 | 2.60 | 0.00 | 0.00 | 0.00 | 1.07 | 0.00 |
| 74 | Cation % | 24.08 | 15.05 | 0.00 | 15.24 | 15.24 | 2.62 | 0.00 | 0.00 | 0.00 | 1.07 | 0.00 |
| 75 | Cation % | 22.46 | 16.14 | 0.00 | 15.68 | 15.68 | 2.58 | 0.00 | 0.00 | 0.00 | 1.06 | 0.00 |
| 76 | Cation % | 24.13 | 8.30 | 0.00 | 13.72 | 13.72 | 8.68 | 0.00 | 0.00 | 0.00 | 0.89 | 0.00 |
| 77 | Cation % | 26.13 | 6.30 | 0.00 | 13.72 | 13.72 | 8.68 | 0.00 | 0.00 | 0.00 | 0.89 | 0.00 |
| 78 | Cation % | 27.13 | 5.30 | 0.00 | 13.72 | 13.72 | 8.68 | 0.00 | 0.00 | 0.00 | 0.89 | 0.00 |

| No. | | $La^{3+}$ | $Gd^{3+}$ | $Y^{3+}$ | $Zr^{4+}$ | $Ti^{4+}$ | $Nb^{5+}$ | $Ta^{5+}$ | $W^{6+}$ | Total |
|---|---|---|---|---|---|---|---|---|---|---|
| 1 | Cation % | 0.00 | 0.00 | 0.00 | 1.69 | 6.18 | 20.85 | 0.00 | 0.99 | 100.00 |
| 2 | Cation % | 0.00 | 0.00 | 0.00 | 1.69 | 6.18 | 20.85 | 0.00 | 0.99 | 100.00 |
| 3 | Cation % | 0.00 | 0.00 | 0.00 | 1.69 | 6.18 | 20.25 | 0.00 | 0.99 | 100.00 |
| 4 | Cation % | 0.00 | 0.00 | 0.00 | 1.69 | 5.69 | 20.25 | 0.00 | 1.49 | 100.00 |
| 5 | Cation % | 0.00 | 0.00 | 0.00 | 1.69 | 5.79 | 20.25 | 0.00 | 1.39 | 100.00 |
| 6 | Cation % | 0.00 | 0.00 | 0.00 | 1.69 | 5.79 | 19.86 | 0.00 | 1.39 | 100.00 |
| 7 | Cation % | 0.00 | 0.00 | 0.00 | 1.69 | 5.79 | 19.66 | 0.00 | 1.39 | 100.00 |
| 8 | Cation % | 0.00 | 0.00 | 0.00 | 1.69 | 6.18 | 20.85 | 0.00 | 0.99 | 100.00 |
| 9 | Cation % | 0.00 | 0.00 | 0.00 | 1.78 | 6.09 | 20.89 | 0.00 | 1.46 | 100.00 |
| 10 | Cation % | 0.00 | 0.00 | 0.00 | 1.69 | 6.18 | 20.85 | 0.00 | 0.99 | 100.00 |
| 11 | Cation % | 0.00 | 0.00 | 0.00 | 1.69 | 6.18 | 20.85 | 0.00 | 0.99 | 100.00 |
| 12 | Cation % | 0.00 | 0.00 | 0.00 | 1.74 | 5.97 | 20.46 | 0.00 | 1.43 | 100.00 |
| 13 | Cation % | 0.00 | 0.00 | 0.00 | 1.69 | 6.18 | 20.85 | 0.00 | 0.99 | 100.00 |
| 14 | Cation % | 0.00 | 0.00 | 0.00 | 1.69 | 6.18 | 20.85 | 0.00 | 0.99 | 100.00 |
| 15 | Cation % | 0.00 | 0.00 | 0.00 | 1.69 | 6.43 | 20.25 | 0.00 | 1.24 | 100.00 |
| 16 | Cation % | 0.00 | 0.00 | 0.00 | 1.69 | 6.43 | 20.25 | 0.00 | 1.24 | 100.00 |
| 17 | Cation % | 0.00 | 0.00 | 0.00 | 1.69 | 6.43 | 20.25 | 0.00 | 1.24 | 100.00 |
| 18 | Cation % | 0.00 | 0.00 | 0.00 | 1.61 | 6.13 | 19.29 | 0.00 | 1.18 | 100.00 |
| 19 | Cation % | 0.00 | 0.00 | 0.00 | 1.54 | 5.85 | 18.42 | 0.00 | 1.13 | 100.00 |
| 20 | Cation % | 0.00 | 0.00 | 0.00 | 1.57 | 5.99 | 18.85 | 0.00 | 1.15 | 100.00 |
| 21 | Cation % | 0.00 | 0.00 | 0.00 | 1.59 | 6.07 | 19.11 | 0.00 | 1.17 | 100.00 |
| 22 | Cation % | 0.00 | 0.00 | 0.00 | 1.56 | 5.96 | 18.76 | 0.00 | 1.15 | 100.00 |
| 23 | Cation % | 0.00 | 0.00 | 0.00 | 1.60 | 6.10 | 19.20 | 0.00 | 1.18 | 100.00 |
| 24 | Cation % | 0.00 | 0.00 | 0.00 | 1.60 | 6.11 | 19.25 | 0.00 | 1.18 | 100.00 |
| 25 | Cation % | 0.00 | 0.00 | 0.00 | 1.59 | 6.07 | 19.11 | 0.00 | 1.17 | 100.00 |
| 26 | Cation % | 0.00 | 0.00 | 0.00 | 1.66 | 6.34 | 19.96 | 0.00 | 1.22 | 100.00 |
| 27 | Cation % | 0.00 | 0.00 | 0.00 | 1.70 | 6.47 | 20.35 | 0.00 | 1.25 | 100.00 |
| 28 | Cation % | 0.00 | 0.00 | 0.00 | 1.70 | 6.46 | 20.35 | 0.00 | 1.25 | 100.00 |
| 29 | Cation % | 0.00 | 0.00 | 0.00 | 1.75 | 6.66 | 20.98 | 0.00 | 1.29 | 100.00 |
| 30 | Cation % | 0.00 | 0.00 | 0.00 | 1.71 | 6.53 | 20.56 | 0.00 | 1.26 | 100.00 |
| 31 | Cation % | 0.00 | 0.00 | 0.00 | 1.75 | 6.66 | 20.98 | 0.00 | 1.29 | 100.00 |
| 32 | Cation % | 0.00 | 0.00 | 0.00 | 1.77 | 6.73 | 21.20 | 0.00 | 1.30 | 100.00 |
| 33 | Cation % | 0.00 | 0.00 | 0.00 | 1.79 | 6.80 | 19.32 | 0.00 | 1.31 | 100.00 |
| 34 | Cation % | 0.00 | 0.00 | 0.00 | 1.79 | 6.80 | 20.37 | 0.00 | 1.31 | 100.00 |
| 35 | Cation % | 0.00 | 0.00 | 0.00 | 1.82 | 6.95 | 19.74 | 0.00 | 1.34 | 100.00 |
| 36 | Cation % | 0.00 | 0.00 | 0.00 | 1.31 | 7.06 | 20.06 | 0.00 | 1.36 | 100.00 |
| 37 | Cation % | 0.00 | 0.00 | 0.00 | 0.77 | 7.10 | 20.17 | 0.00 | 1.37 | 100.00 |
| 38 | Cation % | 0.00 | 0.00 | 0.00 | 1.31 | 7.09 | 20.14 | 0.00 | 1.37 | 100.00 |
| 39 | Cation % | 0.00 | 0.00 | 0.00 | 1.32 | 7.13 | 20.24 | 0.00 | 1.37 | 100.00 |
| 40 | Cation % | 0.00 | 0.00 | 0.00 | 1.32 | 7.14 | 20.28 | 0.00 | 1.38 | 100.00 |
| 41 | Cation % | 0.00 | 0.00 | 0.00 | 1.04 | 7.08 | 20.11 | 0.00 | 1.37 | 100.00 |
| 42 | Cation % | 0.00 | 0.00 | 0.00 | 0.00 | 7.27 | 20.64 | 0.00 | 1.40 | 100.00 |
| 43 | Cation % | 0.00 | 0.00 | 0.00 | 0.00 | 7.39 | 20.99 | 0.00 | 1.43 | 100.00 |
| 44 | Cation % | 0.00 | 0.00 | 0.00 | 1.35 | 7.30 | 20.74 | 0.00 | 1.41 | 100.00 |
| 45 | Cation % | 0.00 | 0.00 | 0.00 | 2.45 | 7.22 | 20.51 | 0.00 | 1.39 | 100.00 |
| 46 | Cation % | 0.00 | 0.00 | 0.00 | 1.32 | 7.10 | 20.17 | 0.00 | 1.37 | 100.00 |
| 47 | Cation % | 0.00 | 0.00 | 0.00 | 2.40 | 7.06 | 20.06 | 0.00 | 1.36 | 100.00 |
| 48 | Cation % | 0.00 | 0.00 | 0.00 | 1.35 | 7.30 | 20.74 | 0.00 | 1.41 | 100.00 |
| 49 | Cation % | 0.00 | 0.00 | 0.00 | 1.38 | 7.47 | 21.22 | 0.00 | 1.44 | 100.00 |
| 50 | Cation % | 0.00 | 0.00 | 0.00 | 0.87 | 8.08 | 20.44 | 0.00 | 1.56 | 100.00 |
| 51 | Cation % | 0.00 | 0.00 | 0.00 | 1.77 | 6.81 | 21.23 | 0.00 | 1.30 | 100.00 |
| 52 | Cation % | 0.00 | 0.00 | 0.00 | 1.81 | 7.28 | 21.36 | 0.00 | 1.33 | 100.00 |
| 53 | Cation % | 0.00 | 0.00 | 0.00 | 1.83 | 7.52 | 21.22 | 0.00 | 1.56 | 100.00 |
| 54 | Cation % | 0.00 | 0.00 | 0.00 | 0.74 | 6.93 | 20.91 | 0.00 | 1.33 | 100.00 |
| 55 | Cation % | 0.00 | 0.00 | 0.00 | 1.29 | 7.34 | 21.18 | 0.00 | 1.34 | 100.00 |
| 56 | Cation % | 0.00 | 0.00 | 0.00 | 0.76 | 7.41 | 21.04 | 0.00 | 1.36 | 100.00 |
| 57 | Cation % | 0.00 | 0.00 | 0.00 | 0.00 | 7.22 | 20.66 | 0.00 | 1.38 | 100.00 |
| 58 | Cation % | 0.00 | 0.00 | 0.00 | 0.00 | 7.30 | 20.85 | 0.00 | 1.40 | 100.00 |
| 59 | Cation % | 0.00 | 0.00 | 0.00 | 0.00 | 7.30 | 20.85 | 0.00 | 1.40 | 100.00 |
| 60 | Cation % | 0.00 | 0.00 | 0.00 | 0.50 | 7.23 | 20.54 | 0.00 | 1.40 | 100.00 |
| 61 | Cation % | 0.00 | 0.00 | 0.00 | 0.78 | 7.61 | 21.16 | 0.00 | 1.39 | 100.00 |
| 62 | Cation % | 0.00 | 0.00 | 0.00 | 1.05 | 7.19 | 20.42 | 0.00 | 1.39 | 100.00 |
| 63 | Cation % | 0.00 | 0.00 | 0.00 | 0.81 | 7.92 | 21.35 | 0.00 | 1.45 | 100.00 |

TABLE 2-continued

| | | | | | | | | | |
|---|---|---|---|---|---|---|---|---|---|
| 64 | Cation % | 0.00 | 0.00 | 0.00 | 0.78 | 6.54 | 21.75 | 0.00 | 1.40 | 100.00 |
| 65 | Cation % | 0.00 | 0.00 | 0.00 | 0.75 | 7.33 | 20.82 | 0.00 | 1.34 | 100.00 |
| 66 | Cation % | 0.00 | 0.00 | 0.00 | 0.77 | 6.43 | 20.84 | 0.00 | 1.38 | 100.00 |
| 67 | Cation % | 0.00 | 0.00 | 0.00 | 0.77 | 7.51 | 20.55 | 0.00 | 0.82 | 100.00 |
| 68 | Cation % | 0.00 | 0.00 | 0.00 | 0.79 | 6.61 | 20.86 | 0.00 | 1.42 | 100.00 |
| 69 | Cation % | 0.00 | 0.00 | 0.00 | 0.83 | 4.55 | 20.57 | 0.00 | 1.49 | 100.00 |
| 70 | Cation % | 0.00 | 0.00 | 0.00 | 0.86 | 3.48 | 20.39 | 0.00 | 1.54 | 100.00 |
| 71 | Cation % | 0.00 | 0.00 | 0.00 | 0.90 | 2.36 | 20.16 | 0.00 | 1.61 | 100.00 |
| 72 | Cation % | 0.00 | 0.00 | 0.00 | 0.97 | 0.00 | 19.79 | 0.00 | 1.73 | 100.00 |
| 73 | Cation % | 0.00 | 0.00 | 0.00 | 0.91 | 2.93 | 20.31 | 0.00 | 1.63 | 100.00 |
| 74 | Cation % | 0.00 | 0.00 | 0.00 | 0.92 | 3.73 | 20.41 | 0.00 | 1.64 | 100.00 |
| 75 | Cation % | 0.00 | 0.00 | 0.00 | 0.90 | 3.74 | 20.14 | 0.00 | 1.61 | 100.00 |
| 76 | Cation % | 0.00 | 0.00 | 0.00 | 0.76 | 7.41 | 21.04 | 0.00 | 1.36 | 100.00 |
| 77 | Cation % | 0.00 | 0.00 | 0.00 | 0.76 | 7.41 | 21.04 | 0.00 | 1.36 | 100.00 |
| 78 | Cation % | 0.00 | 0.00 | 0.00 | 0.76 | 7.41 | 21.04 | 0.00 | 1.36 | 100.00 |

| No. | | $20Si^{4+} + 2Nb^{5+}$ (=H) | $8B^{3+} + 6Li^+ + 5Na^+ + 3K^+ + 3Zn^{2+} + 7W^{6+}$ (=L) | H/L | $Nb^{5+}/(Nb^{5+} + Ti^{4+})$ | $Ba^{2+} + Ca^{2+}$ |
|---|---|---|---|---|---|---|
| 1 | Cation % | 444.75 | 301.20 | 1.48 | 0.77 | 1.69 |
| 2 | Cation % | 444.75 | 308.65 | 1.44 | 0.77 | 1.69 |
| 3 | Cation % | 455.48 | 301.20 | 1.51 | 0.77 | 1.69 |
| 4 | Cation % | 455.48 | 304.68 | 1.49 | 0.78 | 1.69 |
| 5 | Cation % | 455.48 | 303.98 | 1.50 | 0.78 | 1.69 |
| 6 | Cation % | 462.62 | 303.98 | 1.52 | 0.77 | 1.69 |
| 7 | Cation % | 466.20 | 303.98 | 1.53 | 0.77 | 1.69 |
| 8 | Cation % | 544.03 | 261.49 | 2.08 | 0.77 | 1.69 |
| 9 | Cation % | 486.79 | 278.07 | 1.75 | 0.77 | 1.78 |
| 10 | Cation % | 484.46 | 285.32 | 1.70 | 0.77 | 1.69 |
| 11 | Cation % | 603.59 | 237.67 | 2.54 | 0.77 | 1.69 |
| 12 | Cation % | 476.82 | 288.75 | 1.65 | 0.77 | 1.74 |
| 13 | Cation % | 534.10 | 265.46 | 2.01 | 0.77 | 1.69 |
| 14 | Cation % | 524.17 | 269.43 | 1.95 | 0.77 | 1.69 |
| 15 | Cation % | 445.55 | 305.42 | 1.46 | 0.76 | 1.69 |
| 16 | Cation % | 445.55 | 281.59 | 1.58 | 0.76 | 1.69 |
| 17 | Cation % | 445.55 | 260.75 | 1.71 | 0.76 | 1.69 |
| 18 | Cation % | 424.48 | 305.16 | 1.39 | 0.76 | 1.61 |
| 19 | Cation % | 405.31 | 304.93 | 1.33 | 0.76 | 1.54 |
| 20 | Cation % | 414.67 | 305.04 | 1.36 | 0.76 | 1.57 |
| 21 | Cation % | 420.50 | 305.12 | 1.38 | 0.76 | 1.59 |
| 22 | Cation % | 412.77 | 305.02 | 1.35 | 0.76 | 1.56 |
| 23 | Cation % | 422.48 | 306.55 | 1.38 | 0.76 | 1.13 |
| 24 | Cation % | 423.48 | 307.27 | 1.38 | 0.76 | 0.90 |
| 25 | Cation % | 420.50 | 305.12 | 1.38 | 0.76 | 1.59 |
| 26 | Cation % | 439.05 | 299.13 | 1.47 | 0.76 | 1.17 |
| 27 | Cation % | 447.77 | 295.22 | 1.52 | 0.76 | 1.20 |
| 28 | Cation % | 447.73 | 291.33 | 1.54 | 0.76 | 1.20 |
| 29 | Cation % | 461.59 | 269.36 | 1.71 | 0.76 | 1.23 |
| 30 | Cation % | 452.28 | 269.98 | 1.68 | 0.76 | 1.21 |
| 31 | Cation % | 461.59 | 264.22 | 1.75 | 0.76 | 1.23 |
| 32 | Cation % | 466.38 | 269.04 | 1.73 | 0.76 | 1.25 |
| 33 | Cation % | 467.08 | 275.02 | 1.70 | 0.74 | 1.26 |
| 34 | Cation % | 469.18 | 261.37 | 1.80 | 0.75 | 1.26 |
| 35 | Cation % | 477.10 | 258.39 | 1.85 | 0.74 | 1.29 |
| 36 | Cation % | 484.90 | 253.90 | 1.91 | 0.74 | 1.31 |
| 37 | Cation % | 487.56 | 255.29 | 1.91 | 0.74 | 1.32 |
| 38 | Cation % | 486.92 | 254.95 | 1.91 | 0.74 | 0.90 |
| 39 | Cation % | 489.28 | 256.19 | 1.91 | 0.74 | 0.42 |
| 40 | Cation % | 490.25 | 253.39 | 1.93 | 0.74 | 1.32 |
| 41 | Cation % | 486.23 | 254.59 | 1.91 | 0.74 | 1.31 |
| 42 | Cation % | 498.93 | 257.88 | 1.93 | 0.74 | 0.92 |
| 43 | Cation % | 461.84 | 262.29 | 1.76 | 0.74 | 1.51 |
| 44 | Cation % | 501.30 | 252.34 | 1.99 | 0.74 | 1.35 |
| 45 | Cation % | 495.71 | 249.53 | 1.99 | 0.74 | 1.34 |
| 46 | Cation % | 487.56 | 252.00 | 1.93 | 0.74 | 1.86 |
| 47 | Cation % | 484.90 | 250.63 | 1.93 | 0.74 | 1.31 |
| 48 | Cation % | 501.35 | 248.28 | 2.02 | 0.74 | 1.35 |
| 49 | Cation % | 512.86 | 251.24 | 2.04 | 0.74 | 1.38 |
| 50 | Cation % | 549.42 | 244.17 | 2.25 | 0.72 | 1.50 |
| 51 | Cation % | 468.13 | 270.11 | 1.73 | 0.76 | 0.86 |
| 52 | Cation % | 477.46 | 264.14 | 1.81 | 0.75 | 0.87 |
| 53 | Cation % | 481.85 | 259.88 | 1.85 | 0.74 | 0.88 |
| 54 | Cation % | 474.95 | 274.84 | 1.73 | 0.75 | 0.87 |
| 55 | Cation % | 481.08 | 266.56 | 1.80 | 0.74 | 0.88 |
| 56 | Cation % | 484.60 | 268.87 | 1.80 | 0.74 | 0.89 |
| 57 | Cation % | 492.15 | 268.40 | 1.83 | 0.74 | 0.91 |
| 58 | Cation % | 497.82 | 262.60 | 1.90 | 0.74 | 0.92 |
| 59 | Cation % | 497.82 | 258.13 | 1.93 | 0.74 | 0.92 |
| 60 | Cation % | 496.43 | 256.58 | 1.93 | 0.74 | 0.92 |
| 61 | Cation % | 496.66 | 258.24 | 1.92 | 0.74 | 0.91 |

TABLE 2-continued

| No. | | | | | | |
|---|---|---|---|---|---|---|
| 62 | Cation % | 493.67 | 255.16 | 1.93 | 0.74 | 0.91 |
| 63 | Cation % | 516.01 | 241.18 | 2.14 | 0.73 | 0.95 |
| 64 | Cation % | 456.05 | 277.91 | 1.64 | 0.77 | 0.92 |
| 65 | Cation % | 500.86 | 265.99 | 1.88 | 0.74 | 0.88 |
| 66 | Cation % | 491.51 | 273.32 | 1.80 | 0.76 | 0.90 |
| 67 | Cation % | 489.45 | 268.57 | 1.82 | 0.73 | 0.90 |
| 68 | Cation % | 504.31 | 274.26 | 1.84 | 0.76 | 0.93 |
| 69 | Cation % | 526.28 | 284.07 | 1.85 | 0.82 | 0.98 |
| 70 | Cation % | 542.01 | 289.80 | 1.87 | 0.85 | 1.01 |
| 71 | Cation % | 567.44 | 297.03 | 1.91 | 0.90 | 1.06 |
| 72 | Cation % | 604.12 | 309.81 | 1.95 | 1.00 | 1.13 |
| 73 | Cation % | 545.69 | 302.53 | 1.80 | 0.87 | 1.07 |
| 74 | Cation % | 522.38 | 307.38 | 1.70 | 0.85 | 1.07 |
| 75 | Cation % | 489.48 | 320.64 | 1.53 | 0.84 | 1.06 |
| 76 | Cation % | 524.60 | 252.87 | 2.07 | 0.74 | 0.89 |
| 77 | Cation % | 564.60 | 236.87 | 2.38 | 0.74 | 0.89 |
| 78 | Cation % | 584.60 | 228.87 | 2.55 | 0.74 | 0.89 |

| No. | | $Ba^{2+} + Ca^{2+} + Zr^{4+}$ | $Ti^{4+} + Nb^{5+} + Zr^{4+}$ | $Ti^{4+} + Nb^{5+} + W^{6+} + Ba^{2+} + Ca^{2+} + Zr^{4+} + Li^{+}$ | $Si^{4+} + B^{3+}$ | $B^{3+}/(Si^{4+} + B^{3+})$ | $Li^{+} + Na^{+} + K^{+}$ | $K^{+}/(Li^{+} + Na^{+} + K^{+})$ |
|---|---|---|---|---|---|---|---|---|
| 1 | Cation % | 3.38 | 28.72 | 46.29 | 35.04 | 0.42 | 32.07 | 0.07 |
| 2 | Cation % | 3.38 | 28.72 | 46.29 | 36.53 | 0.45 | 32.07 | 0.07 |
| 3 | Cation % | 3.38 | 28.12 | 45.70 | 35.64 | 0.42 | 32.07 | 0.07 |
| 4 | Cation % | 3.38 | 27.63 | 45.70 | 35.64 | 0.42 | 32.07 | 0.07 |
| 5 | Cation % | 3.38 | 27.73 | 45.70 | 35.64 | 0.42 | 32.07 | 0.07 |
| 6 | Cation % | 3.38 | 27.33 | 45.30 | 36.04 | 0.41 | 32.07 | 0.07 |
| 7 | Cation % | 3.38 | 27.13 | 45.10 | 36.24 | 0.41 | 32.07 | 0.07 |
| 8 | Cation % | 3.38 | 28.72 | 46.29 | 35.04 | 0.28 | 32.07 | 0.07 |
| 9 | Cation % | 3.55 | 28.76 | 47.67 | 32.70 | 0.32 | 33.74 | 0.07 |
| 10 | Cation % | 3.38 | 28.72 | 46.29 | 35.04 | 0.37 | 32.07 | 0.07 |
| 11 | Cation % | 3.38 | 28.72 | 46.29 | 35.04 | 0.20 | 32.07 | 0.07 |
| 12 | Cation % | 3.48 | 28.17 | 46.69 | 34.07 | 0.36 | 33.05 | 0.07 |
| 13 | Cation % | 3.38 | 28.72 | 46.29 | 35.04 | 0.30 | 32.07 | 0.07 |
| 14 | Cation % | 3.38 | 28.72 | 46.29 | 35.04 | 0.31 | 32.07 | 0.07 |
| 15 | Cation % | 3.38 | 28.37 | 46.19 | 35.64 | 0.43 | 32.07 | 0.07 |
| 16 | Cation % | 3.38 | 28.37 | 38.25 | 35.64 | 0.43 | 32.07 | 0.32 |
| 17 | Cation % | 3.38 | 28.37 | 31.30 | 35.64 | 0.43 | 32.07 | 0.54 |
| 18 | Cation % | 3.22 | 27.03 | 44.01 | 33.95 | 0.43 | 35.28 | 0.20 |
| 19 | Cation % | 3.07 | 25.81 | 42.02 | 32.42 | 0.43 | 38.20 | 0.29 |
| 20 | Cation % | 3.14 | 26.41 | 42.99 | 33.17 | 0.43 | 36.77 | 0.25 |
| 21 | Cation % | 3.19 | 26.78 | 43.60 | 33.64 | 0.43 | 35.88 | 0.22 |
| 22 | Cation % | 3.13 | 26.29 | 42.79 | 33.02 | 0.43 | 37.06 | 0.26 |
| 23 | Cation % | 2.73 | 26.90 | 43.33 | 33.79 | 0.43 | 36.05 | 0.22 |
| 24 | Cation % | 2.50 | 26.97 | 43.20 | 33.87 | 0.43 | 36.14 | 0.22 |
| 25 | Cation % | 3.19 | 26.78 | 43.60 | 33.64 | 0.43 | 35.88 | 0.22 |
| 26 | Cation % | 2.84 | 27.96 | 43.49 | 35.12 | 0.43 | 33.55 | 0.22 |
| 27 | Cation % | 2.89 | 28.51 | 43.58 | 35.82 | 0.43 | 32.23 | 0.22 |
| 28 | Cation % | 2.89 | 28.51 | 42.80 | 35.81 | 0.43 | 32.23 | 0.27 |
| 29 | Cation % | 2.98 | 29.39 | 44.92 | 31.78 | 0.34 | 35.28 | 0.26 |
| 30 | Cation % | 2.92 | 28.80 | 44.02 | 31.14 | 0.34 | 36.58 | 0.30 |
| 31 | Cation % | 2.98 | 29.39 | 44.92 | 30.75 | 0.32 | 36.31 | 0.28 |
| 32 | Cation % | 3.01 | 29.70 | 45.39 | 32.11 | 0.34 | 34.60 | 0.24 |
| 33 | Cation % | 3.05 | 27.91 | 43.77 | 32.45 | 0.34 | 36.02 | 0.26 |
| 34 | Cation % | 3.05 | 28.96 | 44.82 | 30.35 | 0.29 | 37.07 | 0.28 |
| 35 | Cation % | 3.11 | 28.51 | 44.71 | 29.93 | 0.27 | 37.86 | 0.28 |
| 36 | Cation % | 2.62 | 28.43 | 44.89 | 29.33 | 0.24 | 38.48 | 0.28 |
| 37 | Cation % | 2.08 | 28.04 | 44.59 | 29.49 | 0.24 | 38.69 | 0.28 |
| 38 | Cation % | 2.21 | 28.55 | 44.66 | 29.45 | 0.24 | 38.64 | 0.28 |
| 39 | Cation % | 1.74 | 28.69 | 44.40 | 29.59 | 0.24 | 38.83 | 0.28 |
| 40 | Cation % | 2.65 | 28.74 | 45.39 | 29.65 | 0.24 | 38.91 | 0.28 |
| 41 | Cation % | 2.35 | 28.24 | 44.74 | 29.41 | 0.24 | 38.59 | 0.28 |
| 42 | Cation % | 0.92 | 27.91 | 44.42 | 30.17 | 0.24 | 39.60 | 0.28 |
| 43 | Cation % | 1.51 | 28.39 | 45.75 | 28.41 | 0.26 | 40.27 | 0.28 |
| 44 | Cation % | 2.70 | 29.39 | 46.41 | 30.32 | 0.24 | 37.53 | 0.24 |
| 45 | Cation % | 3.79 | 30.18 | 47.01 | 29.98 | 0.24 | 37.11 | 0.24 |
| 46 | Cation % | 3.18 | 28.59 | 45.69 | 29.49 | 0.24 | 38.69 | 0.28 |
| 47 | Cation % | 3.71 | 29.52 | 45.98 | 29.33 | 0.24 | 38.48 | 0.28 |
| 48 | Cation % | 2.71 | 29.40 | 45.60 | 30.32 | 0.24 | 37.52 | 0.28 |
| 49 | Cation % | 2.77 | 30.07 | 47.48 | 31.02 | 0.24 | 36.09 | 0.19 |
| 50 | Cation % | 2.37 | 29.39 | 48.21 | 31.04 | 0.18 | 36.52 | 0.14 |
| 51 | Cation % | 2.63 | 29.82 | 45.17 | 32.24 | 0.34 | 35.79 | 0.26 |
| 52 | Cation % | 2.69 | 30.45 | 46.14 | 31.86 | 0.32 | 35.48 | 0.24 |
| 53 | Cation % | 2.71 | 30.57 | 46.63 | 31.13 | 0.29 | 35.86 | 0.24 |
| 54 | Cation % | 1.61 | 28.59 | 44.21 | 32.80 | 0.34 | 36.41 | 0.26 |
| 55 | Cation % | 2.17 | 29.82 | 45.65 | 32.15 | 0.32 | 35.81 | 0.24 |
| 56 | Cation % | 1.65 | 29.21 | 45.17 | 32.43 | 0.32 | 36.12 | 0.24 |
| 57 | Cation % | 0.91 | 27.88 | 44.14 | 31.93 | 0.29 | 37.90 | 0.26 |
| 58 | Cation % | 0.92 | 28.15 | 44.61 | 31.19 | 0.27 | 38.35 | 0.26 |
| 59 | Cation % | 0.92 | 28.15 | 44.61 | 30.63 | 0.26 | 38.35 | 0.26 |

TABLE 2-continued

| | | | | | | | | |
|---|---|---|---|---|---|---|---|---|
| 60 | Cation % | 1.42 | 28.27 | 44.70 | 30.02 | 0.24 | 39.40 | 0.28 |
| 61 | Cation % | 1.69 | 29.54 | 45.94 | 31.07 | 0.27 | 37.08 | 0.24 |
| 62 | Cation % | 1.96 | 28.67 | 45.01 | 29.86 | 0.24 | 39.18 | 0.28 |
| 63 | Cation % | 1.76 | 30.08 | 47.16 | 28.89 | 0.18 | 38.63 | 0.24 |
| 64 | Cation % | 1.70 | 29.07 | 45.57 | 31.28 | 0.34 | 37.33 | 0.24 |
| 65 | Cation % | 1.63 | 28.89 | 44.69 | 33.15 | 0.31 | 35.73 | 0.24 |
| 66 | Cation % | 1.68 | 28.04 | 44.27 | 32.97 | 0.32 | 36.71 | 0.24 |
| 67 | Cation % | 1.67 | 28.82 | 44.45 | 32.86 | 0.32 | 36.59 | 0.24 |
| 68 | Cation % | 1.72 | 28.27 | 44.95 | 33.90 | 0.32 | 35.49 | 0.19 |
| 69 | Cation % | 1.81 | 25.96 | 43.46 | 35.55 | 0.32 | 36.03 | 0.17 |
| 70 | Cation % | 1.87 | 24.73 | 42.81 | 36.73 | 0.32 | 36.00 | 0.14 |
| 71 | Cation % | 1.96 | 23.42 | 42.44 | 38.63 | 0.32 | 35.27 | 0.07 |
| 72 | Cation % | 2.10 | 20.76 | 41.12 | 41.37 | 0.32 | 35.01 | 0.00 |
| 73 | Cation % | 1.98 | 24.15 | 42.66 | 38.92 | 0.35 | 34.24 | 0.08 |
| 74 | Cation % | 1.99 | 25.06 | 43.01 | 39.13 | 0.38 | 33.11 | 0.08 |
| 75 | Cation % | 1.96 | 24.78 | 43.14 | 38.60 | 0.42 | 33.95 | 0.08 |
| 76 | Cation % | 1.65 | 29.21 | 45.17 | 32.43 | 0.26 | 36.12 | 0.24 |
| 77 | Cation % | 1.65 | 29.21 | 45.17 | 32.43 | 0.19 | 36.12 | 0.24 |
| 78 | Cation % | 1.65 | 29.21 | 45.17 | 32.43 | 0.16 | 36.12 | 0.24 |

| No. | Melting temperature (° C.) | Liquidus temperature (° C.) | Glass transition temperature (° C.) | Specific gravity | nd | νd | nc |
|---|---|---|---|---|---|---|---|
| 1 | 1300 | 1010 | 503 | 3.523 | 1.84715 | 24.82 | 1.83737 |
| 2 | 1300 | 1020 | 507 | 3.477 | 1.84277 | 24.78 | 1.83302 |
| 3 | 1300 | 1010 | 506 | 3.501 | 1.84011 | 25.14 | 1.83050 |
| 4 | 1300 | 1020 | 502 | 3.524 | 1.83795 | 25.28 | 1.82844 |
| 5 | 1300 | 1000 | 504 | 3.526 | 1.83872 | 25.31 | 1.82918 |
| 6 | 1300 | 1020 | 501 | 3.509 | 1.83407 | 25.42 | 1.82462 |
| 7 | 1300 | 1020 | 503 | 3.503 | 1.83182 | 25.51 | 1.82247 |
| 8 | 1300 | 1020 | 518 | 3.500 | 1.83675 | 25.26 | 1.82723 |
| 9 | 1300 | 1040 | 508 | 3.561 | 1.84616 | 25.04 | 1.83647 |
| 10 | 1300 | 1015 | 509 | 3.513 | 1.84278 | 25.02 | 1.83307 |
| 11 | 1300 | 1020 | 530 | 3.488 | 1.83074 | 25.50 | 1.82137 |
| 12 | 1300 | 1040 | 506 | 3.541 | 1.84124 | 25.19 | 1.83164 |
| 13 | 1300 | 1040 | 518 | 3.502 | 1.83776 | 25.20 | 1.82823 |
| 14 | 1300 | 1020 | 516 | 3.504 | 1.83887 | 25.15 | 1.82928 |
| 15 | 1300 | 1010 | 505 | 3.511 | 1.84302 | 24.93 | 1.83334 |
| 16 | 1300 | 1040 | 511 | 3.459 | 1.81745 | 25.32 | 1.80818 |
| 17 | 1300 | 1040 | 535 | 3.404 | 1.79374 | 25.83 | 1.78493 |
| 18 | 1300 | 1030 | 493 | 3.462 | 1.82222 | 25.74 | 1.81302 |
| 19 | 1300 | 1040 | 482 | 3.418 | 1.80229 | 26.65 | 1.79362 |
| 20 | 1300 | 1030 | 489 | 3.442 | 1.81283 | 26.25 | 1.80391 |
| 21 | 1300 | 1020 | 492 | 3.455 | 1.81938 | 25.89 | 1.81027 |
| 22 | 1300 | 1040 | 488 | 3.439 | 1.81162 | 26.22 | 1.80270 |
| 23 | 1300 | 1015 | 492 | 3.434 | 1.82001 | 25.71 | 1.81083 |
| 24 | 1300 | 1015 | 493 | 3.427 | 1.81953 | 25.67 | 1.81036 |
| 25 | 1300 | 1035 | 493 | 3.467 | 1.81897 | 25.92 | 1.80990 |
| 26 | 1300 | 1015 | 500 | 3.454 | 1.82810 | 25.21 | 1.81865 |
| 27 | 1300 | 1010 | 504 | 3.457 | 1.83210 | 24.95 | 1.82251 |
| 28 | 1300 | 1020 | 505 | 3.452 | 1.82863 | 25.03 | 1.81913 |
| 29 | 1300 | 1040 | 507 | 3.492 | 1.83674 | 24.93 | 1.82713 |
| 30 | 1300 | 1040 | 503 | 3.473 | 1.82761 | 25.28 | 1.81820 |
| 31 | 1300 | 1040 | 507 | 3.500 | 1.83384 | 25.03 | 1.82427 |
| 32 | 1300 | 1030 | 509 | 3.506 | 1.84036 | 24.74 | 1.83062 |
| 33 | 1300 | 1025 | 504 | 3.458 | 1.82117 | 25.63 | 1.81194 |
| 34 | 1300 | 1030 | 505 | 3.486 | 1.82784 | 25.35 | 1.81847 |
| 35 | 1300 | 1030 | 504 | 3.477 | 1.82235 | 25.65 | 1.81310 |
| 36 | 1300 | 1045 | 501 | 3.474 | 1.82264 | 25.57 | 1.81338 |
| 37 | 1300 | 1045 | 502 | 3.463 | 1.82303 | 25.64 | 1.81165 |
| 38 | 1300 | 1030 | 503 | 3.470 | 1.82255 | 25.48 | 1.81329 |
| 39 | 1300 | 1040 | 505 | 3.434 | 1.82289 | 25.32 | 1.81355 |
| 40 | 1300 | 1040 | 509 | 3.456 | 1.82236 | 25.48 | 1.81309 |
| 41 | 1300 | 1040 | 504 | 3.469 | 1.82161 | 25.58 | 1.81238 |
| 42 | 1300 | 1030 | 505 | 3.424 | 1.81673 | 25.40 | 1.80751 |
| 43 | 1300 | 1045 | 499 | 3.472 | 1.82469 | 25.29 | 1.81532 |
| 44 | 1300 | 1045 | 514 | 3.467 | 1.83198 | 25.04 | 1.82245 |
| 45 | 1300 | 1040 | 518 | 3.497 | 1.83615 | 25.07 | 1.82658 |
| 46 | 1300 | 1050 | 508 | 3.457 | 1.82150 | 25.58 | 1.81228 |
| 47 | 1300 | 1050 | 513 | 3.478 | 1.82656 | 25.47 | 1.81723 |
| 48 | 1300 | 1050 | 514 | 3.468 | 1.82916 | 25.09 | 1.81969 |
| 49 | 1300 | 1040 | 520 | 3.499 | 1.84276 | 24.61 | 1.83294 |
| 50 | 1300 | 1035 | 525 | 3.488 | 1.83960 | 24.72 | 1.82987 |
| 51 | 1300 | 1025 | 511 | 3.471 | 1.83593 | 24.68 | 1.82623 |
| 52 | 1300 | 1020 | 516 | 3.487 | 1.84285 | 24.43 | 1.83296 |
| 53 | 1300 | 1030 | 513 | 3.499 | 1.84413 | 24.40 | 1.83422 |
| 54 | 1300 | 1020 | 509 | 3.441 | 1.82824 | 24.89 | 1.81869 |
| 55 | 1300 | 1020 | 512 | 3.470 | 1.83881 | 24.52 | 1.82900 |
| 56 | 1300 | 1015 | 510 | 3.455 | 1.83518 | 24.58 | 1.82545 |
| 57 | 1300 | 1030 | 507 | 3.425 | 1.82095 | 25.22 | 1.81169 |

TABLE 2-continued

| | | | | | | | | |
|---|---|---|---|---|---|---|---|---|
| 58 | 1300 | 1030 | 507 | 3.432 | 1.82301 | 25.11 | 1.81362 | |
| 59 | 1300 | 1030 | 506 | 3.431 | 1.82179 | 25.19 | 1.81251 | |
| 60 | 1300 | 1040 | 507 | 3.435 | 1.81920 | 25.36 | 1.80993 | |
| 61 | 1300 | 1040 | 513 | 3.464 | 1.83596 | 24.59 | 1.82621 | |
| 62 | 1300 | 1030 | 507 | 3.448 | 1.82170 | 25.37 | 1.81239 | |
| 63 | 1300 | 1040 | 519 | 3.485 | 1.83847 | 24.64 | 1.82878 | |
| 64 | 1300 | 1040 | 504 | 3.483 | 1.83615 | 24.73 | 1.82642 | |
| 65 | 1300 | 1040 | 511 | 3.446 | 1.83050 | 24.71 | 1.82085 | |
| 66 | 1300 | 1050 | 510 | 3.446 | 1.82395 | 25.16 | 1.81456 | |
| 67 | 1300 | 1050 | 512 | 3.415 | 1.82849 | 24.86 | 1.81892 | |
| 68 | 1300 | 1040 | 510 | 3.444 | 1.82681 | 25.09 | 1.81735 | |
| 69 | 1300 | 1040 | 508 | 3.423 | 1.81045 | 26.23 | 1.80157 | |
| 70 | 1300 | 1040 | 509 | 3.413 | 1.79809 | 26.93 | 1.78954 | |
| 71 | 1300 | 1030 | 513 | 3.404 | 1.78856 | 27.66 | 1.78033 | |
| 72 | 1300 | 1030 | 516 | 3.376 | 1.76554 | 29.50 | 1.75803 | |
| 73 | 1300 | 1020 | 510 | 3.414 | 1.79607 | 27.09 | 1.78760 | |
| 74 | 1300 | 1020 | 509 | 3.422 | 1.80596 | 26.35 | 1.79715 | |
| 75 | 1300 | 1010 | 504 | 3.429 | 1.80690 | 26.45 | 1.79808 | |
| 76 | 1300 | 1030 | 515 | 3.440 | 1.82789 | 24.91 | 1.81836 | |
| 77 | 1300 | 1030 | 525 | 3.436 | 1.82454 | 25.05 | 1.81509 | |
| 78 | 1300 | 1030 | 529 | 3.433 | 1.82253 | 25.15 | 1.81318 | |

| No. | nF | ng | PgF | ⊿PgF | λ 80 (nm) | λ 70 (nm) | λ 5 (nm) |
|---|---|---|---|---|---|---|---|
| 1 | 1.87150 | 1.89244 | 0.614 | 0.00991 | 501 | 432 | 363 |
| 2 | 1.86703 | 1.88796 | 0.615 | 0.01171 | 503 | 436 | 364 |
| 3 | 1.86392 | 1.88446 | 0.615 | 0.01155 | 510 | 428 | 361 |
| 4 | 1.86159 | 1.88197 | 0.615 | 0.01199 | 477 | 408 | 361 |
| 5 | 1.86232 | 1.88283 | 0.619 | 0.01615 | 490 | 425 | 361 |
| 6 | 1.85743 | 1.87760 | 0.615 | 0.01221 | 485 | 421 | 361 |
| 7 | 1.85508 | 1.87507 | 0.613 | 0.01062 | 486 | 423 | 361 |
| 8 | 1.86036 | 1.88073 | 0.615 | 0.01202 | 454 | 396 | 359 |
| 9 | 1.87026 | 1.89102 | 0.614 | 0.01115 | 482 | 412 | 359 |
| 10 | 1.86675 | 1.88750 | 0.616 | 0.01283 | 479 | 419 | 362 |
| 11 | 1.85395 | 1.87400 | 0.615 | 0.01301 | 474 | 419 | 362 |
| 12 | 1.86504 | 1.88551 | 0.613 | 0.00992 | 481 | 416 | 361 |
| 13 | 1.86147 | 1.88186 | 0.613 | 0.01048 | 465 | 411 | 361 |
| 14 | 1.86264 | 1.88309 | 0.613 | 0.00998 | 474 | 415 | 362 |
| 15 | 1.86715 | 1.88798 | 0.616 | 0.01266 | 488 | 424 | 362 |
| 16 | 1.84046 | 1.86033 | 0.616 | 0.01283 | 473 | 412 | 360 |
| 17 | 1.81566 | 1.83445 | 0.611 | 0.00965 | 465 | 412 | 358 |
| 18 | 1.84496 | 1.86447 | 0.611 | 0.00886 | 464 | 403 | 357 |
| 19 | 1.82373 | 1.84199 | 0.606 | 0.00611 | 448 | 400 | 353 |
| 20 | 1.83488 | 1.85391 | 0.614 | 0.01342 | 464 | 406 | 355 |
| 21 | 1.84192 | 1.86127 | 0.611 | 0.00968 | 479 | 416 | 357 |
| 22 | 1.83366 | 1.85251 | 0.609 | 0.00775 | 476 | 415 | 356 |
| 23 | 1.84272 | 1.86221 | 0.611 | 0.00914 | 481 | 417 | 358 |
| 24 | 1.84228 | 1.86183 | 0.612 | 0.01037 | 477 | 415 | 358 |
| 25 | 1.84149 | 1.86080 | 0.611 | 0.00963 | 463 | 407 | 356 |
| 26 | 1.85150 | 1.87171 | 0.615 | 0.01230 | 502 | 145 | 360 |
| 27 | 1.85586 | 1.87639 | 0.616 | 0.01220 | 474 | 403 | 360 |
| 28 | 1.85223 | 1.87266 | 0.617 | 0.01397 | 466 | 411 | 361 |
| 29 | 1.86070 | 1.88139 | 0.616 | 0.01290 | 494 | 422 | 361 |
| 30 | 1.85094 | 1.87102 | 0.613 | 0.01052 | 491 | 422 | 359 |
| 31 | 1.85758 | 1.87801 | 0.613 | 0.01008 | 491 | 419 | 360 |
| 32 | 1.86459 | 1.88546 | 0.614 | 0.01060 | 501 | 424 | 362 |
| 33 | 1.84398 | 1.86368 | 0.615 | 0.01269 | 478 | 414 | 358 |
| 34 | 1.85112 | 1.87117 | 0.614 | 0.01141 | 492 | 414 | 358 |
| 35 | 1.84516 | 1.86479 | 0.612 | 0.01016 | 486 | 414 | 357 |
| 36 | 1.84555 | 1.86526 | 0.613 | 0.01041 | 494 | 417 | 357 |
| 37 | 1.84375 | 1.86344 | 0.613 | 0.01125 | 496 | 420 | 358 |
| 38 | 1.84557 | 1.86533 | 0.612 | 0.00971 | 484 | 414 | 359 |
| 39 | 1.84605 | 1.86599 | 0.614 | 0.01081 | 478 | 410 | 358 |
| 40 | 1.84536 | 1.86516 | 0.614 | 0.01114 | 487 | 416 | 359 |
| 41 | 1.84450 | 1.86422 | 0.614 | 0.01169 | 495 | 425 | 359 |
| 42 | 1.83967 | 1.85936 | 0.612 | 0.00967 | 477 | 415 | 358 |
| 43 | 1.84793 | 1.86798 | 0.615 | 0.01206 | 491 | 420 | 358 |
| 44 | 1.85568 | 1.87610 | 0.615 | 0.01128 | 476 | 414 | 359 |
| 45 | 1.85993 | 1.88044 | 0.615 | 0.01182 | 481 | 421 | 360 |
| 46 | 1.84439 | 1.86396 | 0.609 | 0.00721 | 471 | 413 | 357 |
| 47 | 1.84968 | 1.86953 | 0.612 | 0.00935 | 477 | 417 | 358 |
| 48 | 1.85274 | 1.87736 | 0.745 | 0.14179 | 487 | 422 | 360 |
| 49 | 1.86719 | 1.88836 | 0.618 | 0.01410 | 488 | 420 | 361 |
| 50 | 1.86383 | 1.88477 | 0.617 | 0.01280 | 492 | 427 | 362 |
| 51 | 1.86010 | 1.88087 | 0.613 | 0.00935 | 483 | 419 | 361 |
| 52 | 1.86746 | 1.88872 | 0.616 | 0.01191 | 490 | 422 | 362 |
| 53 | 1.86881 | 1.89018 | 0.618 | 0.01343 | 498 | 427 | 362 |
| 54 | 1.85197 | 1.87251 | 0.617 | 0.01369 | 492 | 423 | 362 |
| 55 | 1.86321 | 1.88435 | 0.618 | 0.01378 | 503 | 428 | 363 |
| 56 | 1.85943 | 1.88039 | 0.617 | 0.01278 | 504 | 429 | 363 |

TABLE 2-continued

| | | | | | | | |
|---|---|---|---|---|---|---|---|
| 57 | 1.84424 | 1.86434 | 0.618 | 0.01461 | 476 | 412 | 358 |
| 58 | 1.84640 | 1.86659 | 0.616 | 0.01282 | 475 | 415 | 359 |
| 59 | 1.84513 | 1.86527 | 0.617 | 0.01445 | 509 | 424 | 360 |
| 60 | 1.84223 | 1.86198 | 0.611 | 0.00880 | 469 | 410 | 357 |
| 61 | 1.86020 | 1.88111 | 0.615 | 0.01114 | 491 | 421 | 361 |
| 62 | 1.84478 | 1.86469 | 0.615 | 0.01206 | 480 | 417 | 358 |
| 63 | 1.86281 | 1.88377 | 0.616 | 0.01198 | 499 | 427 | 361 |
| 64 | 1.86023 | 1.88110 | 0.617 | 0.01349 | 484 | 413 | 360 |
| 65 | 1.85446 | 1.87510 | 0.614 | 0.01028 | 475 | 414 | 361 |
| 66 | 1.84731 | 1.86737 | 0.613 | 0.00951 | 479 | 417 | 360 |
| 67 | 1.85224 | 1.87272 | 0.615 | 0.01109 | 488 | 423 | 361 |
| 68 | 1.85030 | 1.87063 | 0.617 | 0.01386 | 478 | 418 | 360 |
| 69 | 1.83247 | 1.85130 | 0.609 | 0.00830 | 468 | 413 | 357 |
| 70 | 1.81918 | 1.83726 | 0.610 | 0.01016 | 461 | 408 | 355 |
| 71 | 1.80884 | 1.82610 | 0.605 | 0.00689 | 438 | 396 | 352 |
| 72 | 1.78398 | 1.79949 | 0.598 | 0.00249 | 423 | 387 | 344 |
| 73 | 1.81699 | 1.83488 | 0.609 | 0.00917 | 435 | 394 | 354 |
| 74 | 1.82774 | 1.84639 | 0.610 | 0.00881 | 446 | 399 | 357 |
| 75 | 1.82859 | 1.84726 | 0.612 | 0.01124 | 454 | 403 | 357 |
| 76 | 1.85160 | 1.87207 | 0.616 | 0.01236 | — | — | — |
| 77 | 1.84801 | 1.86824 | 0.615 | 0.01131 | — | — | — |
| 78 | 1.84588 | 1.86597 | 0.614 | 0.01134 | — | — | — |

No crystals that were observable by microscope precipitated in the optical glasses obtained.

The various characteristics of the optical glasses thus obtained are given in Table 2.

The various characteristics of the optical glasses were measured by the following methods.

(1) Refractive Indexes nd, ng, nF, nc and the Abbé Number v(nu)d

Refractive indexes nd, ng, nF, and nc, and the Abbé number v(nu)d were measured by the refractive index measuring methods of the Japan Optical Glass Industry Society standards for glasses obtained by lowering the temperature at a rate of 30° C./hour.

(2) Liquidus Temperature LT

The liquidus temperature was determined by placing the glass in a furnace that had been heated to a prescribed temperature, maintaining the glass in the furnace for two hours, cooling the glass, and observing the interior of the glass for crystals by optical microscopy at 100-fold magnification.

(3) The Glass Transition Temperature Tg

The glass transition temperature was measured at a temperature increase rate of 10° C./minute by differential scanning calorimetry (DSC).

(4) The Partial Dispersion Ratio Pg,F

This was calculated from the refractive indexes ng, nF, and nc.\

(5) Deviation Δ(DELTA)Pg,F of the Partial Dispersion Ratio from the Normal Line.

This was calculated from the partial dispersion ratio Pg,F$^{(0)}$ on the normal line as calculated from the partial dispersion ratio Pg,F and the Abbé number v(nu)d.

(6) Specific Gravity

The specific gravity was calculated by Archimedes' method.

(7) lambda80, lambda70, lambda5

The spectral transmittance over the wavelength region of 280 nm to 700 nm was measured with glass samples 10 mm in thickness having optically polished, flat, parallel surfaces. The spectral transmittance was obtained by introducing light rays of intensity A perpendicularly into one of the optically polished flat surfaces, measuring the intensity B of the light rays exiting from the other flat surface, and calculating B/A. Accordingly, the spectral transmittance included the loss of light rays by reflection off the sample surface. The wavelength at which the spectral transmittance became 80 percent was the lambda80, the wavelength at which the spectral transmittance became 70 percent was the lambda70, and the wavelength at which the spectral transmittance became 5 percent was the lambda5.

Comparative Examples

Glass was melted by the method described in Patent Reference 5 to obtain the composition of Embodiment 40 therein. As a result, the glass devitrified while in a glass melt state during melting. The devitrified material is shown in Photograph 1.

Embodiment 2

Glass starting materials that had been blended to obtain the various optical glasses prepared in Embodiment 1 were melted, clarified, and homogenized to prepare glass melts. Droplets of the glass melts were made to drip from platinum nozzles and received in preform forming molds. Spherical preforms comprised of the various above glasses were then molded while being floated by means of wind pressure.

Each of the above glass melts was continuously made to flow out of a platinum pipe, the lower tip of the glass melt flow was received in a preform forming mold, a constriction was formed in the glass melt flow, and the preform forming mold was abruptly lowered directly downward to sever the glass melt flow at the constriction. The glass melt gob thus separated was received on the preform forming mold and preforms comprised of the various above glasses were molded while being floated by means of wind pressure.

The preforms obtained were optically homogenous and of high quality.

Embodiment 3

Each of the glass melts prepared in Embodiment 2 was continuously made to flow into a casting mold, molded into a glass block, annealed, and cut to obtain multiple pieces of glass. The pieces of glass were ground and polished to prepare preforms comprised of the various glasses.

The preforms obtained were optically homogenous and of high quality.

Embodiment 4

The surface of each of the preforms obtained in Embodiments 2 and 3 was coated with a carbon-containing film. Each preform was introduced into a pressing mold comprised of upper and lower SiC molds equipped with carbon-based mold-releasing films on the molding surfaces thereof and a sleeve mold. The forming mold and the preform were both heated in a nitrogen atmosphere to soften the preform. The preform was precision press molded to prepare various lenses such as aspherical convex meniscus lenses, aspherical concave meniscus lenses, aspherical biconvex lenses, and aspherical biconcave lenses comprised of the various above glasses. The various precision press molding conditions were adjusted to within the ranges set forth above.

Observation of the various lenses thus fabricated revealed no opacity or the like due to phase separation, scratching of the lens surface, fogging, or damage in any form.

The above process was repeated and large quantity production testing of each lens was conducted. No problems such as fusion of the glass and the pressing mold were observed, and it was possible to produce lenses having both high-quality surfaces and interiors with high precision. Antireflective films could also be coated on the surfaces of lenses thus obtained.

Next, the above preforms that had been coated with carbon-containing films were heated and softened, introduced into pressing molds that had been separately preheated, and precision press molded to prepare various lenses such as aspherical convex meniscus lenses, aspherical concave meniscus lenses, aspherical biconvex lenses, and aspherical biconcave lenses comprised of the various above glasses. The various precision press molding conditions were adjusted to within the ranges set forth above. Observation of the various lenses thus fabricated revealed no opacity or the like due to phase separation, scratching of the lens surface, fogging, or damage in any form.

The above process was repeated and large quantity production testing of each lens was conducted. No problems such as fusion of the glass and the pressing mold were observed, and it was possible to produce lenses having both high-quality surfaces and interiors with high precision. Antireflective films could also be coated on the surfaces of lenses thus obtained.

The various optical elements such as prisms, microlenses and lens arrays can be fabricated by suitably altering the shape of the molding surfaces of the pressing mold.

Embodiment 5

The various lenses fabricated in Embodiment 4 were used to fabricate various replacement lenses for single-lens reflex cameras with various built-in lenses.

The various lenses fabricated in Embodiment 4 were also used to fabricate the optical systems of various compact digital cameras and modularized. Modularization was also conducted by mounting image sensors such as CCDs and CMOSs into these optical systems.

Using the various lenses fabricated in Embodiment 4 in this manner made it possible to obtain high functional, compact optical systems, replacement lenses, lens modules, and image pickup devices. Combining the lenses fabricated in Embodiment 4 with lenses made of high-refractive-index, low-dispersion optical glass made it possible to obtain various optical systems performing high-order chromatic aberration correction and image pickup devices equipped with these optical systems.

INDUSTRIAL APPLICABILITY

The optical glass of the present invention has a high refractive index, a high dispersion property, good resistance to devitrification, and a low glass transition temperature, and is suitable for precision press molding. It is suitable for the correction of high-order chromatic aberration, and for use in manufacturing preforms for precision press molding and optical elements.

What is claimed is:

1. An optical glass in the form of an oxide glass comprising, denoted as cation percentages,
   15 to 35 percent of $Si^{4+}$,
   0 to 20 percent of $B^{3+}$,
   15 to 25 percent of $Nb^{5+}$,
   0 to 9 percent of $Ti^{4+}$,
   0 to 3 percent of $Zr^{4+}$,
   0.25 to 2.5 percent of $W^{6+}$,
   0 to 19 percent of $Li^+$,
   3 to 19 percent of $Na^+$,
   0 to 18 percent of $K^+$,
   0 to 9 percent of $Zn^{2+}$,
   0 to 2 percent of $Ba^{2+}$, and
   0 to 3 percent of $Ca^{2+}$;
   wherein the cation ratio of the $Nb^{5+}$ content to the combined content of $Nb^{5+}$ and $Ti^{4+}$ ($Nb^{5+}/(Nb^{5+}+Ti^{4+})$) falls within a range of 0.71 to 1;
   H/L falls within a range of 1.15 to 2.55, where H denotes the sum of 20 times the $Si^{4+}$ content and twice the $Nb^{5+}$ content ($20Si^{4+}+2Nb^{5+}$), and L denotes the sum of eight times the $B^{3+}$ content, six times the $Li^+$ content, five times the $Na^+$ content, three times the $K^+$ content, three times the $Zn^+$ content, and seven times the $W^{6+}$ content ($8B^{3+}+6Li^++5Na^++3K^++3Zn^{2+}+7W^{6+}$);
   the combined content of $Ti^{4+}$, $Nb^{5+}$, and $Zr^{4+}$ falls within a range of 20 to 30.78 percent;
   the combined content of $Ba^{2+}$, $Ca^{2+}$, and $Zr^{4+}$ falls within a range of 0 to 3.79 percent;
   the combined content of $Ti^{4+}$, $Nb^{5+}$, $W^{6+}$, $Ba^{2+}$, $Ca^{2+}$, $Zr^{4+}$, and $Li^+$ is 50 percent or less;
   the refractive index nd falls within a range of 1.75 to 1.86; and
   the Abbé number v(nu)d falls within a range of 24 to 30.

2. The optical glass according to claim 1, wherein the glass transition temperature falls within a range of 480 to 535° C.

3. The optical glass according to claim 2, wherein the liquidus temperature falls within a range of 1,000 to 1,060° C.

4. An optical element comprised of the optical glass according to claim 3.

5. An image pickup device equipped with the optical element according to claim 4.

6. An optical element comprised of the optical glass according to claim 2.

7. An image pickup device equipped with the optical element according to claim 6.

8. The optical glass according to claim 1, wherein the liquidus temperature falls within a range of 1,000 to 1,060° C.

9. An optical element comprised of the optical glass according to claim 8.

10. An image pickup device equipped with the optical element according to claim 9.

11. The optical glass according to claim 1, wherein the partial dispersion ratio (Pg, F) is 0.57 to 0.62.

12. An optical element comprised of the optical glass according to claim 11.

13. An image pickup device equipped with the optical element according to claim 12.

14. The optical glass according to claim 1, wherein the combined content of $Si^{4+}$ and $B^{3+}$ is 20 to 50 percent.

15. An optical element comprised of the optical glass according to claim 14.

16. An image pickup device equipped with the optical element according to claim 15.

17. The optical glass according to claim 1, wherein the $Sr^{2+}$ content falls within a range of 0 to 2 percent.

18. An optical element comprised of the optical glass according to claim 17.

19. An image pickup device equipped with the optical element according to claim 18.

20. The optical glass according to claim 1, wherein the combined content of $Ba^{2+}$ and $Ca^{2+}$ falls within a range of 0 to 3 percent.

21. An optical element comprised of the optical glass according to claim 20.

22. An image pickup device equipped with the optical element according to claim 21.

23. The optical glass according to claim 1, wherein the combined content of $Li^+$, $Na^+$, and $K^+$ falls within a range of 25 to 45 percent.

24. An optical element comprised of the optical glass according to claim 23.

25. An image pickup device equipped with the optical element according to claim 24.

26. A preform for precision press molding comprised of the optical glass according to claim 1.

27. A method for manufacturing a preform for precision press molding that produces the preform according to claim 26 by the steps of heating and melting a glass starting material to prepare a glass melt, and molding the glass melt.

28. A method for manufacturing an optical element comprising the steps of heating the preform for precision press molding according to claim 26, and employing a pressing mold to conduct precision press molding.

29. The method for manufacturing an optical element according to claim 28, wherein the preform for precision press molding and the pressing mold are heated together and precision press molding is conducted.

30. The method for manufacturing an optical element according to claim 28, wherein the preform for precision press molding is heated and then introduced into a preheated pressing mold, and precision press molding is conducted.

31. An optical element comprised of the optical glass according to claim 1.

32. An image pickup device equipped with the optical element according to claim 31.

* * * * *